US007607980B2

(12) United States Patent
Masci et al.

(10) Patent No.: US 7,607,980 B2
(45) Date of Patent: Oct. 27, 2009

(54) GAMING DEVICE HAVING FREE POTENTIAL WINNING COMBINATIONS

(75) Inventors: Joseph D. Masci, Montrose, NY (US); Howard M. Marks, Scarsdale, NY (US); Anthony M. Singer, Ringwood, NJ (US); Daniel M. Marks, Washington, DC (US)

(73) Assignee: IGT, Reno, NV (US)

(*) Notice: Subject to any disclaimer, the term of this patent is extended or adjusted under 35 U.S.C. 154(b) by 277 days.

(21) Appl. No.: 10/984,169

(22) Filed: Nov. 8, 2004

(65) Prior Publication Data

US 2005/0170876 A1 Aug. 4, 2005

Related U.S. Application Data

(60) Provisional application No. 60/518,844, filed on Nov. 10, 2003.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/20; 463/11; 463/12; 463/13; 463/16; 463/17; 463/18; 463/19; 463/21; 463/25; 273/292

(58) Field of Classification Search ............ 463/11–13, 463/16–21, 25; 273/292
See application file for complete search history.

(56) References Cited

U.S. PATENT DOCUMENTS 4,198,052 A 4/1980 Gauselmann
4,448,419 A 5/1984 Telnaes
4,618,150 A 10/1986 Kimura
4,624,459 A 11/1986 Kaufman (Continued)

FOREIGN PATENT DOCUMENTS

AU 199717601 B2 9/1997

(Continued)

OTHER PUBLICATIONS

A Quantum Leap for Video Poker game descriptions written by IGT published in 2001.

(Continued)

*Primary Examiner*—Dmitry Suhol
*Assistant Examiner*—Jason Pinheiro
(74) *Attorney, Agent, or Firm*—K&L Gates LLP

(57) ABSTRACT

Methods to provide an enhanced likelihood of winning an award and to provide enhanced awards based upon the appearance of symbols on free paylines or free hands of cards. In one embodiment base paylines and a free payline are defined using the same symbol matrix and same reel strips. The free payline is an additional payline with same frequencies of wins and losses as the base paylines. The player wagers upon any number of base paylines. The player receives a free payline if a designated number of base paylines are wagered upon. A multiplier enhances the award for winning symbol combinations appearing on the free payline, with the multiplier value equal to the total wager. In another embodiment, a player wagers upon any number of displayed poker hands. The player receives at least one free hand if a designated number of hands are wagered upon.

21 Claims, 27 Drawing Sheets

U.S. PATENT DOCUMENTS

| | | | | |
|---|---|---|---|---|
| 4,695,053 | A | 9/1987 | Vazquez, Jr. et al. | |
| 4,732,386 | A | 3/1988 | Rayfiel | |
| 4,756,531 | A | 7/1988 | DiRe et al. | |
| 4,838,552 | A | 6/1989 | Hagiwara | |
| 4,991,848 | A | 2/1991 | Greenwood et al. | |
| 5,085,436 | A | 2/1992 | Bennett | |
| 5,209,479 | A | 5/1993 | Nagao et al. | |
| 5,344,144 | A | 9/1994 | Canon | |
| 5,393,061 | A | 2/1995 | Manship et al. | |
| 5,395,111 | A | 3/1995 | Inoue | |
| 5,449,173 | A | 9/1995 | Thomas et al. | |
| 5,580,053 | A | 12/1996 | Crouch | |
| 5,580,055 | A | 12/1996 | Hagiwara | |
| 5,584,764 | A | 12/1996 | Inoue | |
| 5,611,535 | A * | 3/1997 | Tiberio | 273/143 R |
| 5,752,881 | A | 5/1998 | Inoue | |
| 5,769,716 | A | 6/1998 | Saffari et al. | |
| 5,772,509 | A | 6/1998 | Weiss | |
| 5,788,573 | A | 8/1998 | Baerlocher et al. | |
| 5,807,172 | A | 9/1998 | Piechowiak | |
| 5,823,874 | A | 10/1998 | Adams | |
| 5,833,536 | A | 11/1998 | Davids et al. | |
| 5,833,537 | A | 11/1998 | Barrie | |
| 5,848,932 | A | 12/1998 | Adams | |
| 5,851,148 | A | 12/1998 | Brune et al. | |
| 5,882,261 | A | 3/1999 | Adams | |
| 5,890,962 | A | 4/1999 | Takemoto | |
| 5,902,184 | A | 5/1999 | Bennett et al. | |
| 5,919,088 | A | 7/1999 | Weiss | |
| 5,927,714 | A | 7/1999 | Kaplan | |
| 5,947,820 | A | 9/1999 | Morro et al. | |
| 5,951,397 | A | 9/1999 | Dickinson | |
| 5,980,384 | A | 11/1999 | Barrie | |
| 5,984,781 | A | 11/1999 | Sunaga | |
| 5,984,782 | A | 11/1999 | Inoue | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,027,115 | A | 2/2000 | Griswold et al. | |
| 6,033,307 | A | 3/2000 | Vancura | |
| 6,056,642 | A | 5/2000 | Bennett | |
| 6,059,289 | A | 5/2000 | Vancura | |
| 6,062,980 | A | 5/2000 | Luciano | |
| 6,089,976 | A | 7/2000 | Schneider et al. | |
| 6,089,977 | A | 7/2000 | Bennett | |
| 6,093,102 | A | 7/2000 | Bennett | |
| 6,095,921 | A | 8/2000 | Walker et al. | |
| 6,102,798 | A | 8/2000 | Bennett | |
| 6,113,098 | A | 9/2000 | Adams | |
| 6,120,031 | A | 9/2000 | Moody | |
| 6,120,377 | A | 9/2000 | McGinnis, Sr. et al. | |
| 6,120,378 | A | 9/2000 | Moody et al. | |
| 6,126,542 | A | 10/2000 | Fier | |
| 6,146,273 | A | 11/2000 | Olsen | |
| 6,155,925 | A * | 12/2000 | Giobbi et al. | 463/20 |
| 6,159,095 | A | 12/2000 | Frohm et al. | |
| 6,159,097 | A | 12/2000 | Gura | |
| 6,159,098 | A | 12/2000 | Slomiany et al. | |
| 6,165,070 | A | 12/2000 | Nolte et al. | |
| 6,168,520 | B1 | 1/2001 | Baerlocher et al. | |
| 6,174,233 | B1 | 1/2001 | Sunaga et al. | |
| 6,186,894 | B1 * | 2/2001 | Mayeroff | 463/20 |
| 6,186,984 | B1 | 2/2001 | Mayeroff | |
| 6,190,254 | B1 | 2/2001 | Bennett | |
| 6,190,255 | B1 | 2/2001 | Thomas et al. | |
| 6,200,217 | B1 | 3/2001 | Osawa | |
| 6,203,430 | B1 | 3/2001 | Walker et al. | |
| 6,220,959 | B1 * | 4/2001 | Holmes et al. | 463/13 |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,241,607 | B1 * | 6/2001 | Payne et al. | 463/20 |
| 6,251,013 | B1 | 6/2001 | Bennett | |
| 6,261,177 | B1 | 7/2001 | Bennett | |
| 6,261,178 | B1 * | 7/2001 | Bennett | 463/20 |
| 6,270,411 | B1 | 8/2001 | Gura et al. | |
| 6,299,165 | B1 | 10/2001 | Nagano | |
| 6,309,299 | B1 | 10/2001 | Weiss | |
| 6,309,300 | B1 | 10/2001 | Glavich | |
| 6,311,976 | B1 | 11/2001 | Yoseloff et al. | |
| 6,315,660 | B1 | 11/2001 | DeMar et al. | |
| 6,315,664 | B1 | 11/2001 | Baerlocher et al. | |
| 6,319,124 | B1 | 11/2001 | Baerlocher et al. | |
| 6,328,649 | B1 | 12/2001 | Randall et al. | |
| 6,336,860 | B1 | 1/2002 | Webb | |
| 6,346,043 | B1 | 2/2002 | Colin et al. | |
| 6,347,996 | B1 | 2/2002 | Gilmore et al. | |
| 6,364,314 | B1 | 4/2002 | Canterbury | |
| 6,364,766 | B1 | 4/2002 | Anderson et al. | |
| 6,413,162 | B1 | 7/2002 | Baerlocher et al. | |
| 6,419,579 | B1 | 7/2002 | Bennett | |
| 6,439,993 | B1 | 8/2002 | O'Halloran | |
| 6,461,241 | B1 | 10/2002 | Webb et al. | |
| 6,464,581 | B1 | 10/2002 | Yoseloff et al. | |
| 6,491,584 | B2 | 12/2002 | Graham et al. | |
| 6,494,454 | B2 | 12/2002 | Adams | |
| 6,517,432 | B1 | 2/2003 | Jaffe | |
| 6,547,242 | B1 | 4/2003 | Sugiyama et al. | |
| 6,551,187 | B1 | 4/2003 | Jaffe | |
| 6,558,254 | B2 | 5/2003 | Baerlocher et al. | |
| 6,561,900 | B1 | 5/2003 | Baerlocher et al. | |
| 6,602,137 | B2 | 8/2003 | Kaminkow et al. | |
| 6,604,999 | B2 * | 8/2003 | Ainsworth | 463/20 |
| 6,605,002 | B2 | 8/2003 | Baerlocher | |
| 6,609,971 | B2 | 8/2003 | Vancura | |
| 6,612,575 | B1 | 9/2003 | Cole et al. | |
| 6,616,142 | B2 | 9/2003 | Adams | |
| 7,011,581 | B2 | 3/2006 | Cole et al. | |
| 2001/0048193 | A1 * | 12/2001 | Yoseloff et al. | 273/138.1 |
| 2001/0054794 | A1 | 12/2001 | Cole et al. | |
| 2002/0025844 | A1 | 2/2002 | Casey et al. | |
| 2002/0055382 | A1 * | 5/2002 | Meyer | 463/20 |
| 2002/0094857 | A1 | 7/2002 | Meyer | |
| 2003/0045345 | A1 | 3/2003 | Berman | |
| 2003/0054875 | A1 | 3/2003 | Marks et al. | |
| 2003/0114215 | A1 * | 6/2003 | Adams et al. | 463/20 |
| 2003/0216165 | A1 | 11/2003 | Singer et al. | |
| 2004/0009803 | A1 | 1/2004 | Bennett et al. | |
| 2004/0023714 | A1 | 2/2004 | Asdale | |
| 2004/0195773 | A1 | 10/2004 | Masci et al. | |
| 2004/0242314 | A1 | 12/2004 | Casey | |
| 2005/0075157 | A1 * | 4/2005 | Seelig et al. | 463/16 |
| 2005/0130733 | A1 * | 6/2005 | Mierau et al. | 463/20 |
| 2005/0153770 | A1 * | 7/2005 | Vancura | 463/16 |
| 2006/0160609 | A1 * | 7/2006 | Dicarlo | 463/25 |

FOREIGN PATENT DOCUMENTS

| | | | |
|---|---|---|---|
| EP | 0060019 | | 9/1982 |
| EP | 0 238 289 | A3 | 9/1987 |
| EP | 0410789 | | 7/1990 |
| EP | 0 945 837 | A2 | 9/1999 |
| EP | 0984408 | | 3/2000 |
| EP | 1205984 | A2 | 10/2001 |
| EP | 1298606 | | 4/2003 |
| EP | 1184822 | A3 | 6/2003 |
| EP | 1396829 | | 3/2004 |
| EP | 1396829 | A2 * | 3/2004 |
| GB | 2170636 | | 2/1986 |
| GB | 2170636 | A * | 8/1986 |
| GB | 2226907 | | 7/1990 |
| GB | 2 328 311 | A | 2/1999 |
| WO | WO 00/66235 | | 11/2000 |
| WO | WO 00/76606 | A1 | 12/2000 |

| | | |
|---|---|---|
| WO | WO 01/19476 | 3/2001 |
| WO | WO 01/087441 | 11/2001 |
| WO | WO 03/049055 A2 | 3/2003 |
| WO | WO 03/026758 | 4/2003 |

OTHER PUBLICATIONS

Addams Family—Cousin It's Hair Day Advertisement, written by IGT, published Mar. 2004.
Basics of Pick 'Em Poker website, written by gambling-hall-online, published Aug. 17, 2004.
Bingo Advertisement written by Casino Data System, published in 1998.
Black Swan advertisement by IGT, published prior to 2001.
Crazy Fruits Article written by Strictly Slots, published in 2001.
Double Diamond District Slotto Advertisement, written AC Coin & Slot, published 2003.
Enchanted Unicorn—Unicorn Bonus Advertisements written by IGT, published in 2001.
Evil Kneivel Advertisement written by IGT, published in 2001.
Five Card Instant Bingo Advertisement, written by IGT, published in 2000.
Fortune Cookie Advertisement written by IGT, published in 2000.
Money to Burn Advertisement written by WMS Gaming, Inc., published date unknown.
Penguin Pays Advertisement, written by Aristocrat Incorporated, published in 1998.
Reel MAGIC™ Gaming Machine Description, written by IGT, available in 1986.
Regis Cash Club Advertisement written by IGT, published in 2000.
Slots Machines Article, written by Marshall Fey, published 1983, 1989, 1991, 1994 and 1997.
South Park Advertisement written by IGT, published in 2000.
Sphinx II—e-motion Article in Strictly Slots, written by Atronic Casino Technology Ltd., undated.
Stooges II Article written by Strictly Slots, published in Jun. 2001.
Texas Tea Advertisement written by IGT, published in 2000.
Totem Pole Advertisement written by IGT, published in 1997.
Wild Streak Advertisement, written by WMS Gaming, Inc., published in 2001.
Office Action dated Jan. 9, 2007 for U.S. Appl. No. 10/371,016.

* cited by examiner

FIG. 4A

PayTable

160a

| | | |
|---|---|---|
| A-A-A-A-A........100 | A-A-A-A..............75 | A-A-A.................40 |
| B-B-B-B-B..........90 | B-B-B-B..............50 | B-B-B.................30 |
| C-C-C-C-C.........80 | C-C-C-C.............40 | C-C-C................25 |
| D-D-D-D-D.........70 | D-D-D-D.............35 | D-D-D................20 |
| E-E-E-E-E..........60 | E-E-E-E..............30 | E-E-E................15 |
| F-F-F-F-F...........50 | F-F-F-F...............25 | F-F-F.................10 |
| G-G-G-G-G........40 | G-G-G-G.............20 | G-G-G.................9 |
| H-H-H-H-H.........30 | H-H-H-H.............15 | H-H-H..................8 |
| I-I-I-I-I.................20 | I-I-I-I....................10 | I-I-I........................7 |
| J-J-J-J-J.............15 | J-J-J-J...................9 | J-J-J.....................6 |
| K-K-K-K-K..........12 | K-K-K-K................8 | .K-K-K...................5 |
| L-L-L-L-L.............10 | L-L-L-L.................7 | L-L-L.....................4 |
| M-M-M-M-M.........8 | M-M-M-M.............6 | M-M-M...................3 |
| N-N-N-N-N...........6 | N-N-N-N...............5 | N-N-N....................2 |
| O-O-O-O-O..........4 | O-O-O-O..............4 | O-O-O....................1 |

FIG. 4B

PayTable

160b

| | | |
|---|---|---|
| A-A-A-A-A........1000 | A-A-A-A..............750 | A-A-A.................400 |
| B-B-B-B-B..........900 | B-B-B-B..............500 | B-B-B.................300 |
| C-C-C-C-C.........800 | C-C-C-C.............400 | C-C-C................250 |
| D-D-D-D-D.........700 | D-D-D-D.............350 | D-D-D................200 |
| E-E-E-E-E..........600 | E-E-E-E..............300 | E-E-E................150 |
| F-F-F-F-F...........500 | F-F-F-F...............250 | F-F-F.................100 |
| G-G-G-G-G........400 | G-G-G-G.............200 | G-G-G..................75 |
| H-H-H-H-H.........300 | H-H-H-H.............150 | H-H-H...................50 |
| I-I-I-I-I................200 | I-I-I-I.....................100 | I-I-I........................40 |
| J-J-J-J-J.............100 | J-J-J-J...................75 | J-J-J......................30 |
| K-K-K-K-K..........800 | K-K-K-K.................50 | K-K-K....................20 |
| L-L-L-L-L.............60 | L-L-L-L.................40 | L-L-L.....................10 |
| M-M-M-M-M.........40 | M-M-M-M.............25 | M-M-M....................8 |
| N-N-N-N-N...........20 | N-N-N-N................10 | N-N-N.....................5 |
| O-O-O-O-O..........10 | O-O-O-O................5 | O-O-O...................2 |

FIG. 7A

260

| | | Symbol 1 | | Symbol 2 | | Symbol 3 | | Symbol 4 | | Symbol 5 | |
|---|---|---|---|---|---|---|---|---|---|---|---|
| PayLine | | Col | Row | Col | Row | Col | Row | Col | Row | Col | Row |
| 1 | at 262a uses | 1 | 1 | 2 | 1 | 3 | 1 | 4 | 1 | 5 | 1 |
| 2 | at 262b uses | 1 | 2 | 2 | 2 | 3 | 2 | 4 | 2 | 5 | 2 |
| 3 | at 262c uses | 1 | 3 | 2 | 3 | 3 | 3 | 4 | 3 | 5 | 3 |
| 4 | at 262d uses | 1 | 4 | 2 | 4 | 3 | 4 | 4 | 4 | 5 | 4 |
| 5 | at 262e uses | 1 | 5 | 2 | 5 | 3 | 5 | 4 | 5 | 5 | 5 |
| 6 | at 262f uses | 1 | 6 | 2 | 6 | 3 | 6 | 4 | 6 | 5 | 6 |
| 7 | at 262g uses | 1 | 7 | 2 | 7 | 3 | 7 | 4 | 7 | 5 | 7 |
| 8 | at 262h uses | 1 | 8 | 2 | 8 | 3 | 8 | 4 | 8 | 5 | 8 |
| 9 | at 262i uses | 1 | 9 | 2 | 9 | 3 | 9 | 4 | 9 | 5 | 9 |
| 10 | at 262j uses | 1 | 10 | 2 | 10 | 3 | 10 | 4 | 10 | 5 | 10 |
| 11 | at 264a uses | 1 | 11 | 2 | 11 | 3 | 11 | 4 | 11 | 5 | 11 |
| 12 | at 264b uses | 1 | 12 | 2 | 12 | 3 | 12 | 4 | 12 | 5 | 12 |
| 13 | at 264c uses | 1 | 13 | 2 | 13 | 3 | 13 | 4 | 13 | 5 | 13 |
| 14 | at 264d uses | 1 | 14 | 2 | 14 | 3 | 14 | 4 | 14 | 5 | 14 |
| 15 | at 264e uses | 1 | 15 | 2 | 15 | 3 | 15 | 4 | 15 | 5 | 15 |
| 16 | at 264f uses | 1 | 16 | 2 | 16 | 3 | 16 | 4 | 16 | 5 | 16 |
| 17 | at 264g uses | 1 | 17 | 2 | 17 | 3 | 17 | 4 | 17 | 5 | 17 |
| 18 | at 264h uses | 1 | 18 | 2 | 18 | 3 | 18 | 4 | 18 | 5 | 18 |
| 19 | at 264i uses | 1 | 19 | 2 | 19 | 3 | 19 | 4 | 19 | 5 | 19 |
| 20 | at 264j uses | 1 | 20 | 2 | 20 | 3 | 20 | 4 | 20 | 5 | 20 |
| 21 | at 266a uses | 1 | 21 | 2 | 21 | 3 | 21 | 4 | 21 | 5 | 21 |
| 22 | at 266b uses | 1 | 22 | 2 | 22 | 3 | 22 | 4 | 22 | 5 | 22 |
| 23 | at 266c uses | 1 | 23 | 2 | 23 | 3 | 23 | 4 | 23 | 5 | 23 |
| 24 | at 266d uses | 1 | 24 | 2 | 24 | 3 | 24 | 4 | 24 | 5 | 24 |
| 25 | at 266e uses | 1 | 25 | 2 | 25 | 3 | 25 | 4 | 25 | 5 | 25 |
| 26 | at 266f uses | 1 | 26 | 2 | 26 | 3 | 26 | 4 | 26 | 5 | 26 |
| 27 | at 266g uses | 1 | 27 | 2 | 27 | 3 | 27 | 4 | 27 | 5 | 27 |
| 28 | at 266h uses | 1 | 28 | 2 | 28 | 3 | 28 | 4 | 28 | 5 | 28 |
| 29 | at 266i uses | 1 | 29 | 2 | 29 | 3 | 29 | 4 | 29 | 5 | 29 |
| 30 | at 266j uses | 1 | 30 | 2 | 30 | 3 | 30 | 4 | 30 | 5 | 30 |
| 31 | at 268a uses | 1 | 31 | 2 | 31 | 3 | 31 | 4 | 31 | 5 | 31 |
| 32 | at 268b uses | 1 | 32 | 2 | 32 | 3 | 32 | 4 | 32 | 5 | 32 |
| 33 | at 268c uses | 1 | 33 | 2 | 33 | 3 | 33 | 4 | 33 | 5 | 33 |
| 34 | at 268d uses | 1 | 34 | 2 | 34 | 3 | 34 | 4 | 34 | 5 | 34 |
| 35 | at 268e uses | 1 | 35 | 2 | 35 | 3 | 35 | 4 | 35 | 5 | 35 |
| 36 | at 268f uses | 1 | 36 | 2 | 36 | 3 | 36 | 4 | 36 | 5 | 36 |
| 37 | at 268g uses | 1 | 37 | 2 | 37 | 3 | 37 | 4 | 37 | 5 | 37 |
| 38 | at 268h uses | 1 | 38 | 2 | 38 | 3 | 38 | 4 | 38 | 5 | 38 |
| 39 | at 268i uses | 1 | 39 | 2 | 39 | 3 | 39 | 4 | 39 | 5 | 39 |
| 40 | at 268j uses | 1 | 40 | 2 | 40 | 3 | 40 | 4 | 40 | 5 | 40 |
| 41 | at 270a uses | 1 | 41 | 2 | 41 | 3 | 41 | 4 | 41 | 5 | 41 |
| 42 | at 270b uses | 1 | 42 | 2 | 42 | 3 | 42 | 4 | 42 | 5 | 42 |
| 43 | at 270c uses | 1 | 43 | 2 | 43 | 3 | 43 | 4 | 43 | 5 | 43 |
| 44 | at 270d uses | 1 | 44 | 2 | 44 | 3 | 44 | 4 | 44 | 5 | 44 |
| 45 | at 270e uses | 1 | 45 | 2 | 45 | 3 | 45 | 4 | 45 | 5 | 45 |
| 46 | at 270f uses | 1 | 46 | 2 | 46 | 3 | 46 | 4 | 46 | 5 | 46 |
| 47 | at 270g uses | 1 | 47 | 2 | 47 | 3 | 47 | 4 | 47 | 5 | 47 |
| 48 | at 270h uses | 1 | 48 | 2 | 48 | 3 | 48 | 4 | 48 | 5 | 48 |
| 49 | at 270i uses | 1 | 49 | 2 | 49 | 3 | 49 | 4 | 49 | 5 | 49 |
| 50 | at 270j uses | 1 | 50 | 2 | 50 | 3 | 50 | 4 | 50 | 5 | 50 |
| 51 | at 272 uses | 1 | 51 | 2 | 51 | 3 | 51 | 4 | 51 | 5 | 51 |

FIG. 7B

262

| | Column 1 | Column 2 | Column 3 | Column 4 | Column 5 | |
|---|---|---|---|---|---|---|
| Row 1 | Symbol 1 | Symbol 2 | Symbol 3 | Symbol 4 | Symbol 5 | 262a |
| Row 2 | Symbol 1 | Symbol 2 | Symbol 3 | Symbol 4 | Symbol 5 | 262b |
| Row 3 | Symbol 1 | Symbol 2 | Symbol 3 | Symbol 4 | Symbol 5 | 262c |
| Row 4 | Symbol 1 | Symbol 2 | Symbol 3 | Symbol 4 | Symbol 5 | 262d |
| Row 5 | Symbol 1 | Symbol 2 | Symbol 3 | Symbol 4 | Symbol 5 | 262e |
| Row 6 | Symbol 1 | Symbol 2 | Symbol 3 | Symbol 4 | Symbol 5 | 262f |
| Row 7 | Symbol 1 | Symbol 2 | Symbol 3 | Symbol 4 | Symbol 5 | 262g |
| Row 8 | Symbol 1 | Symbol 2 | Symbol 3 | Symbol 4 | Symbol 5 | 262h |
| Row 9 | Symbol 1 | Symbol 2 | Symbol 3 | Symbol 4 | Symbol 5 | 262i |
| Row 10 | Symbol 1 | Symbol 2 | Symbol 3 | Symbol 4 | Symbol 5 | 262j |
| Row 11 | Symbol 1 | Symbol 2 | Symbol 3 | Symbol 4 | Symbol 5 | 264a |
| Row 12 | Symbol 1 | Symbol 2 | Symbol 3 | Symbol 4 | Symbol 5 | 264b |
| Row 13 | Symbol 1 | Symbol 2 | Symbol 3 | Symbol 4 | Symbol 5 | 264c |
| Row 14 | Symbol 1 | Symbol 2 | Symbol 3 | Symbol 4 | Symbol 5 | 264d |
| Row 15 | Symbol 1 | Symbol 2 | Symbol 3 | Symbol 4 | Symbol 5 | 264e |
| Row 16 | Symbol 1 | Symbol 2 | Symbol 3 | Symbol 4 | Symbol 5 | 264f |
| Row 17 | Symbol 1 | Symbol 2 | Symbol 3 | Symbol 4 | Symbol 5 | 264g |
| Row 18 | Symbol 1 | Symbol 2 | Symbol 3 | Symbol 4 | Symbol 5 | 264h |
| Row 19 | Symbol 1 | Symbol 2 | Symbol 3 | Symbol 4 | Symbol 5 | 264i |
| Row 20 | Symbol 1 | Symbol 2 | Symbol 3 | Symbol 4 | Symbol 5 | 264j |
| Row 21 | Symbol 1 | Symbol 2 | Symbol 3 | Symbol 4 | Symbol 5 | 266a |
| Row 22 | Symbol 1 | Symbol 2 | Symbol 3 | Symbol 4 | Symbol 5 | 266b |
| Row 23 | Symbol 1 | Symbol 2 | Symbol 3 | Symbol 4 | Symbol 5 | 266c |
| Row 24 | Symbol 1 | Symbol 2 | Symbol 3 | Symbol 4 | Symbol 5 | 266d |
| Row 25 | Symbol 1 | Symbol 2 | Symbol 3 | Symbol 4 | Symbol 5 | 266e |
| Row 26 | Symbol 1 | Symbol 2 | Symbol 3 | Symbol 4 | Symbol 5 | 266f |
| Row 27 | Symbol 1 | Symbol 2 | Symbol 3 | Symbol 4 | Symbol 5 | 266g |
| Row 28 | Symbol 1 | Symbol 2 | Symbol 3 | Symbol 4 | Symbol 5 | 266h |
| Row 29 | Symbol 1 | Symbol 2 | Symbol 3 | Symbol 4 | Symbol 5 | 266i |
| Row 30 | Symbol 1 | Symbol 2 | Symbol 3 | Symbol 4 | Symbol 5 | 266j |
| Row 31 | Symbol 1 | Symbol 2 | Symbol 3 | Symbol 4 | Symbol 5 | 268a |
| Row 32 | Symbol 1 | Symbol 2 | Symbol 3 | Symbol 4 | Symbol 5 | 268b |
| Row 33 | Symbol 1 | Symbol 2 | Symbol 3 | Symbol 4 | Symbol 5 | 268c |
| Row 34 | Symbol 1 | Symbol 2 | Symbol 3 | Symbol 4 | Symbol 5 | 268d |
| Row 35 | Symbol 1 | Symbol 2 | Symbol 3 | Symbol 4 | Symbol 5 | 268e |
| Row 36 | Symbol 1 | Symbol 2 | Symbol 3 | Symbol 4 | Symbol 5 | 268f |
| Row 37 | Symbol 1 | Symbol 2 | Symbol 3 | Symbol 4 | Symbol 5 | 268g |
| Row 38 | Symbol 1 | Symbol 2 | Symbol 3 | Symbol 4 | Symbol 5 | 268h |
| Row 39 | Symbol 1 | Symbol 2 | Symbol 3 | Symbol 4 | Symbol 5 | 268i |
| Row 40 | Symbol 1 | Symbol 2 | Symbol 3 | Symbol 4 | Symbol 5 | 268j |
| Row 41 | Symbol 1 | Symbol 2 | Symbol 3 | Symbol 4 | Symbol 5 | 270a |
| Row 42 | Symbol 1 | Symbol 2 | Symbol 3 | Symbol 4 | Symbol 5 | 270b |
| Row 43 | Symbol 1 | Symbol 2 | Symbol 3 | Symbol 4 | Symbol 5 | 270c |
| Row 44 | Symbol 1 | Symbol 2 | Symbol 3 | Symbol 4 | Symbol 5 | 270d |
| Row 45 | Symbol 1 | Symbol 2 | Symbol 3 | Symbol 4 | Symbol 5 | 270e |
| Row 46 | Symbol 1 | Symbol 2 | Symbol 3 | Symbol 4 | Symbol 5 | 270f |
| Row 47 | Symbol 1 | Symbol 2 | Symbol 3 | Symbol 4 | Symbol 5 | 270g |
| Row 48 | Symbol 1 | Symbol 2 | Symbol 3 | Symbol 4 | Symbol 5 | 270h |
| Row 49 | Symbol 1 | Symbol 2 | Symbol 3 | Symbol 4 | Symbol 5 | 270i |
| Row 50 | Symbol 1 | Symbol 2 | Symbol 3 | Symbol 4 | Symbol 5 | 270j |
| Row 51 | Symbol 1 | Symbol 2 | Symbol 3 | Symbol 4 | Symbol 5 | 272 |

Free Enhanced Payline

FIG. 9A

360

| | Number Of Coins Bet | | | | |
|---|---|---|---|---|---|
| **POKER HAND** | 10 | 20 | 30 | 40 | 50 |
| ROYAL FLUSH | 75 | 100 | 200 | 300 | **400** |
| STRAIGHT FLUSH | 50 | 75 | 125 | 150 | 200 |
| FOUR ACES | 40 | 60 | 90 | 120 | 150 |
| FULL HOUSE | 25 | 50 | 75 | 100 | 125 |
| FLUSH | 20 | 40 | 60 | 80 | 100 |
| STRAIGHT | 15 | 30 | 45 | 50 | 75 |
| THREE-OF-A-KIND | 10 | 20 | 30 | 40 | 50 |
| TWO PAIR | 5 | 10 | 15 | 20 | 25 |

FIG. 9B

362

| | Number Of Coins Bet | | | | |
|---|---|---|---|---|---|
| **POKER HAND** | 10 | 20 | 30 | 40 | 50 |
| ROYAL FLUSH | **250** | **500** | **750** | **1000** | **4000** |
| STRAIGHT FLUSH | 100 | 200 | 300 | 400 | 500 |
| FOUR ACES | **80** | **160** | **240** | **320** | **400** |
| FULL HOUSE | 50 | 100 | 150 | 200 | 250 |
| FLUSH | 40 | 80 | 120 | 160 | 200 |
| STRAIGHT | 30 | 60 | 90 | 120 | 150 |
| THREE-OF-A-KIND | 20 | 40 | 60 | 80 | 100 |
| TWO PAIR | 10 | 20 | 30 | 40 | 50 |

GAMING DEVICE HAVING FREE POTENTIAL WINNING COMBINATIONS

PRIORITY CLAIM

This application is a non-provisional application of, claims priority to and the benefit of U.S. Provisional Patent Application Ser. No. 60/518,844 filed on Nov. 10, 2003, the entire contents of which is incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has more opportunities to win awards and potentially larger awards are ways to enhance player enjoyment and excitement. Gaming machines or devices provide games, such as slot games and poker games, in which a player has one or more opportunities to obtain a winning symbol combination on mechanical or video reels or on a hand of cards. In these gaming devices, the player initiates the spin of the reels or dealing a hand of cards by making a wager on one or more different paylines or hand of cards associated with positions at which the reels or cards display symbols. The combination of symbols displayed in the positions associated with each wagered-on payline or hand of cards determines whether a player wins a value for that wagered-on payline or hand of cards and, if so, how much value the player wins. The amount won for each payline or hand of cards is usually based on the amount wagered on that payline or hand of cards.

One known method to enhance player enjoyment and excitement is to provide a payline associated with the reels in a slot game upon which the player does not directly wager, but which provides an increased chance of winning an award nonetheless.

Another known method to enhance player enjoyment and excitement is to provide a payline associated with reels in a slot game having a greater value than another payline. The greater valued payline provides a greater award for the same symbol combination than another payline. For example, a higher multiplier can be associated with the greater valued payline.

For example, U.S. Pat. No. 6,261,178 B1 discloses a gaming device that randomly selects a set of symbol locations which define an additional mystery payline in a game. The mystery payline, however, is not enhanced by any value.

U.S. Publication No. 2003/0054875 discloses a slot game with a random indicator that enhances all wins on an indicated payline by a multiplier such as 4×. The enhanced payline is directly wagered upon by the player.

U.S. Publication No. 2004/0195773 discloses a slot game that assigns a multiplier to each payline to enhance all wins on that payline. The enhanced payline, however, is not free and is directly wagered upon by the player.

No known games use an enhanced and free payline or an enhanced and free hand of cards. In particular, no known game offers both a free payline or upon which the player does not directly wager and enhanced awards for winning symbol combinations appearing on the free payline. Nor does any known game provide a free hand of cards upon which the player does not directly wager and an enhanced award for a winning hand appearing on the free hand of cards. There is, therefore, a need for new and exciting and entertaining games.

SUMMARY OF THE INVENTION

The present invention relates in general to a gaming device and more particularly to a gaming device having a variety of methods to provide an enhanced likelihood of winning an award and enhanced awards based upon the indication of symbols generated along one or more free paylines or generated on cards in a free hand of cards.

In one embodiment of the present invention, the gaming device includes a game including a plurality of reels each having symbols thereon. The symbols are generated and displayed on the reels at symbol display positions on a display device. To play the game, the player wagers upon a number of base paylines associated with the symbol display positions to activate those paylines. Upon activation of a designated number of base paylines, the gaming device activates at least one additional payline requiring no additional wager. For example, a player wagering on nine paylines also receives a free tenth payline. At least one of the symbol display positions associated with or displayed along this free payline is different from the symbol display positions associated with or displayed along the other activated paylines. The free payline or paylines may be predetermined or randomly determined. It should also be appreciated that the free payline feature may always be activated, may be randomly activated, may be activated upon a triggering event, may be activated upon a designated wager level, or may be activated in another suitable manner.

In one embodiment of the present invention, the base paylines use a different set of reel strips than the free enhanced payline. For example, the base paylines all share five reel strips and a five-column by three-row symbol matrix. The free enhanced payline uses a different set of five reel strips and a five-column by one-row symbol matrix.

In one embodiment of the present invention, at least one free enhanced payline is provided for wagering upon at least one base payline. For example, the game provides one free enhanced payline for wagering upon one base payline.

In another embodiment, the player is provided a free payline for every predetermined number of paylines wagered upon. The predetermined number of wagered-on paylines is at least two and can be greater than two. For example, for every five paylines wagered upon, the player receives a free payline. The predetermined number of wagered-on paylines is scaled in one embodiment to determine the number of free paylines to be activated. For example, the first nine paylines wagered on may provide one free payline, the next six paylines wagered on may provide at least one additional free payline, and the next three paylines wagered on may provide at least one additional free paylines.

The gaming device spins the reels to generate combinations of the symbols on the reels. The gaming device provides an award for any winning combination of symbols displayed at symbol display positions along each payline wagered upon.

In one embodiment, a modifier such as a multiplier enhances the award for any winning symbol combination indicated along each free payline. In one embodiment, the modifier enhances the award for winning symbol combinations displayed at symbol display positions along any or each of the free paylines. In one embodiment, the modifier value is based on the total wager by the player on all of the activated paylines. For example, a total wager of forty-five credits on all of the wagered-on paylines combined sets a multiplier value to 45× which is used to enhance the award on the free payline. Thus, this embodiment of the present invention provides the player not only the benefit of the free payline, but additionally the benefit of the player's entire wager which is associated with this free payline. It should also be appreciated that the present invention contemplates having scaled modifiers or enhancements of the free paylines. For example, if the first nine wagered upon paylines provides a first free payline, the enhancement on that payline may be the credits wagered on the first nine paylines, and the enhancement for the free payline provided for wagers on the next six lines may be the total amount wagered on all fifteen wagered upon paylines.

In one embodiment, a bonus or secondary game or event can be triggered by a triggering symbol or triggering symbol combination occurring on an activated free payline in a similar manner to being triggered on any of the activated base paylines. In another embodiment, a bonus or secondary game or event can only be triggered by a triggering symbol or triggering symbol combination occurring on an activated free payline.

One embodiment of the present invention includes providing a hand in a poker game upon which the player does not directly wager, and which provides an increased chance of winning an award nonetheless. In one embodiment, the primary game is a multi-hand poker game with one or more free hands for wagering upon a predetermined number of other hands. For example, the game awards one free hand for playing at least one wager hand. In another embodiment, the primary game offers a player-selectable number of hands to wager upon with one or more free hands for each hand wagered upon. For example, the game awards one free hand for every five games or hands wagered upon.

In one embodiment, the one or more free hands use the same pay schedule or paytable as the wagered upon hands. For example, a winning hand such as a pair may pay one unit in both wager hands and free hands. In another embodiment, the one or more free hands uses a different paytable than the wager hands. For example, a pair may pay one unit in a wager hand and two units in a free hand.

Another embodiment includes providing a poker hand in a poker game having a greater value than another hand, wherein the greater valued hand provides a greater award for the same winning combination than another hand. For example, a modifier of greater value can be associated with the greater valued hand. In one embodiment, the one or more free hands offer enhanced awards for winning card combinations. The enhancements can be based upon the total wager, wager per hand, or number of hands wagered upon. For example, a winning hand, such as a pair, may pay one unit for the wager hand and, for the free hand, multiply one unit by the total bet to provide to the player.

In one embodiment, each of the wager and free hands are dealt from independent decks. For example, a free hand and each of the wager hands are dealt from their own deck of cards.

In one embodiment, the one or more free hands use the same number of card ranks and suits as the wager hands. For example, the wager and free hands may both use traditional decks of cards. Alternatively, the one or more free hands may use different numbers of card ranks or suits than the wager hands. For example, the wager hands may use traditional decks of cards and the free hands may use a modified deck of cards.

In one embodiment, the one or more free hands use the same number of card positions as the wager hands. For example, the wager and free hands may both use five card positions. Alternatively, the free hands may use different numbers of card positions than the wager hands. For example, the wager hands may use five card positions and the free hand may use seven card positions.

In one embodiment, the cards dealt into the card positions of the free hand may be duplicated into the card positions of the wagered upon hands, or vice-versa. For example, the game deals a card into the five card positions of a free hand and then duplicates the same cards into the five card positions of each of the wager hands. Further, the decisions made for the cards in the free hand are duplicated for each of the wager hands. For example, the two cards held in the free hand of five-card draw poker are also held in each of the wager hands of the game.

In one embodiment, the one or more free hands use the same poker game as the wager hands. For example, the wager and free hands may both use five-card draw poker. Alternatively, the one or more free hands use different poker games than the wager hands. For example, the wager hands may use five-card draw poker and the free hand may use five-card stud poker.

Further, each of the hands is played independently of the other hands. For example, the draw/hold decisions for each draw poker hand are made independently of the others.

It is therefore an advantage of the present invention to provide a gaming device having an enhanced free payline.

It is also an advantage of the present invention to provide a gaming device having an enhanced free poker hand.

A further advantage of the present invention is to provide a gaming device that enhances the likelihood of winning an award in a game.

Another advantage of the present invention is to provide a gaming device that provides enhanced awards in a game.

Additional features and advantages of the present invention are described in, and will be apparent from, the following Detailed Description of the Invention and the figures.

BRIEF DESCRIPTION OF THE FIGURES

FIG. 4A and 4B are schematics of award tables associated with one embodiment of the present invention.

FIG. 7A is a schematic of a payline display area of one embodiment of the present invention.

FIG. 7B is a schematic of a symbol matrix defining paylines of a payline display area of one embodiment of the present invention.

FIG. 9A and 9B are schematics of award tables associated with one embodiment of the present invention.

DETAILED DESCRIPTION OF THE INVENTION

Gaming Device and Electronics

Figure 1A:
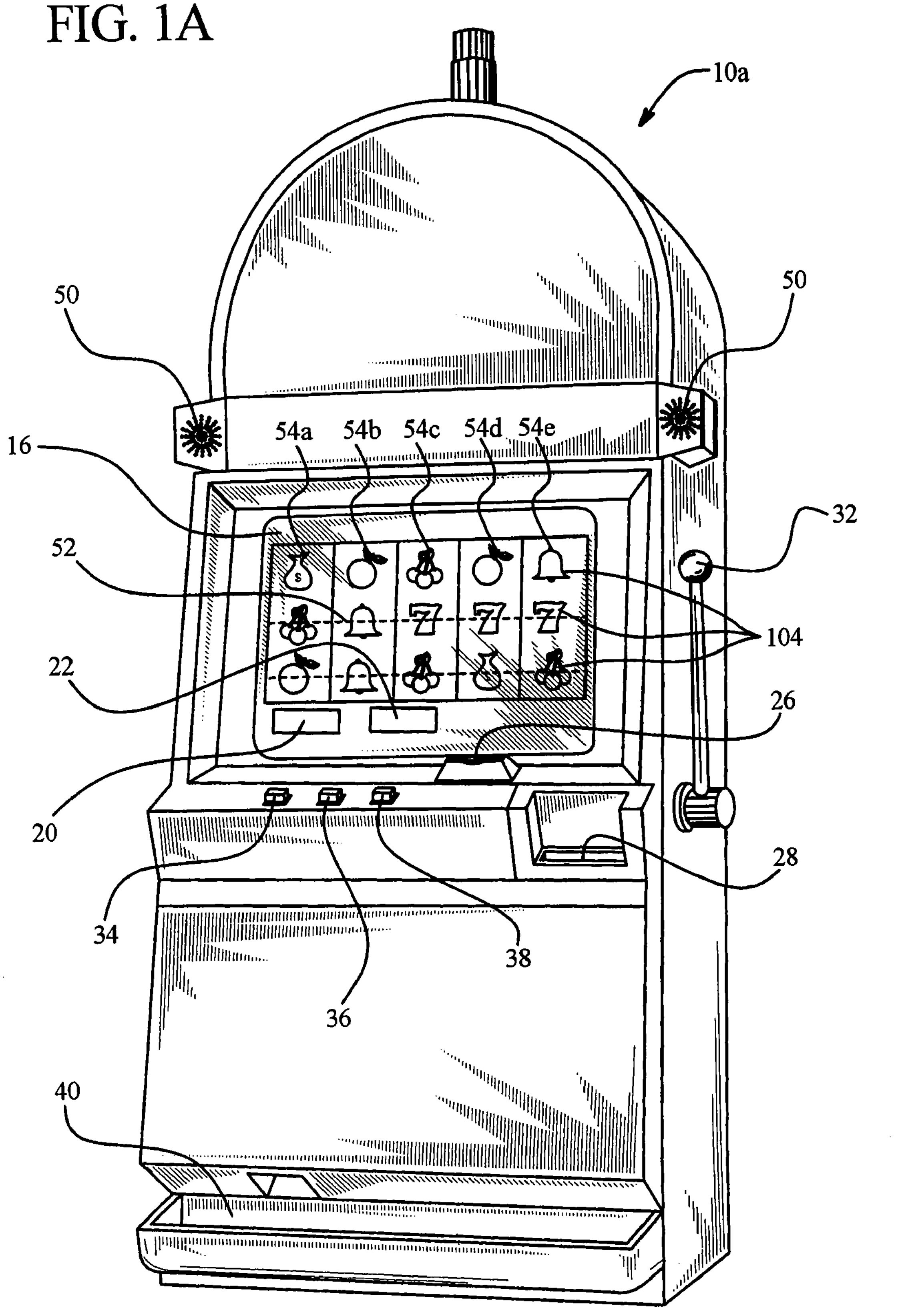
FIG. 1A is a front-side perspective view of one embodiment of the gaming device of the present invention.
Figure 1B:
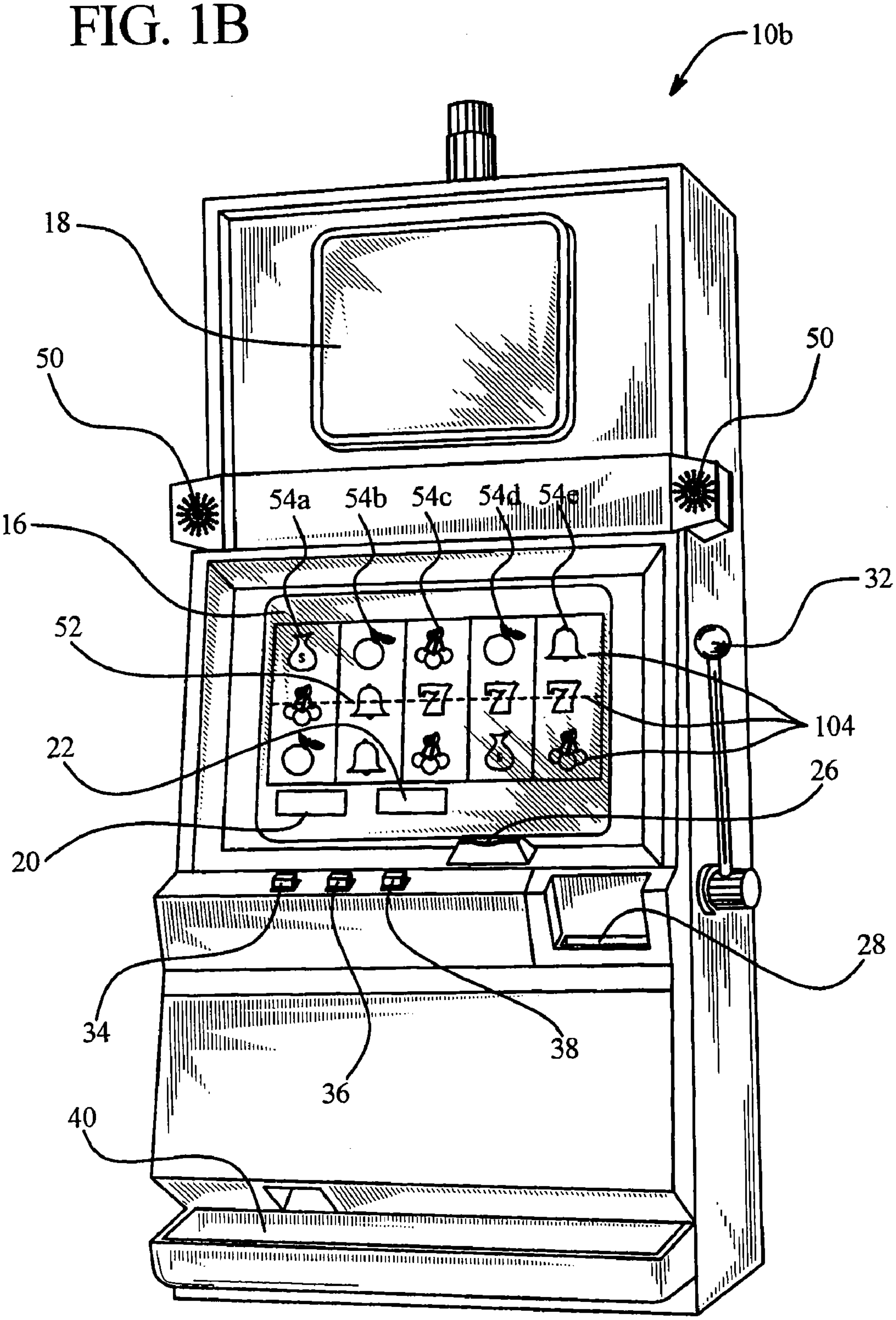
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
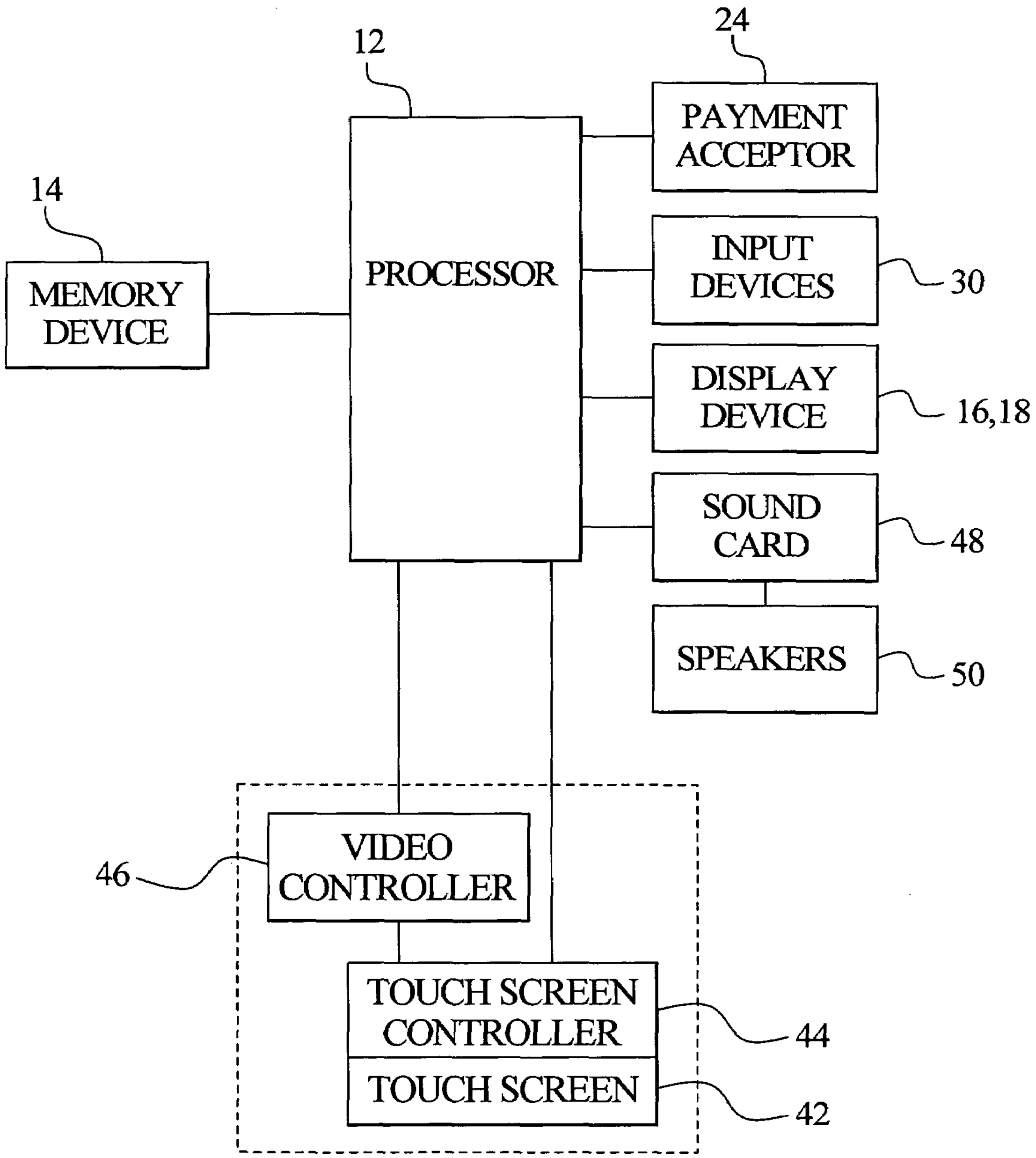
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, electronic funds transfer devices such as readers or validators for credit cards, debit cards or credit slips can be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIG. 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
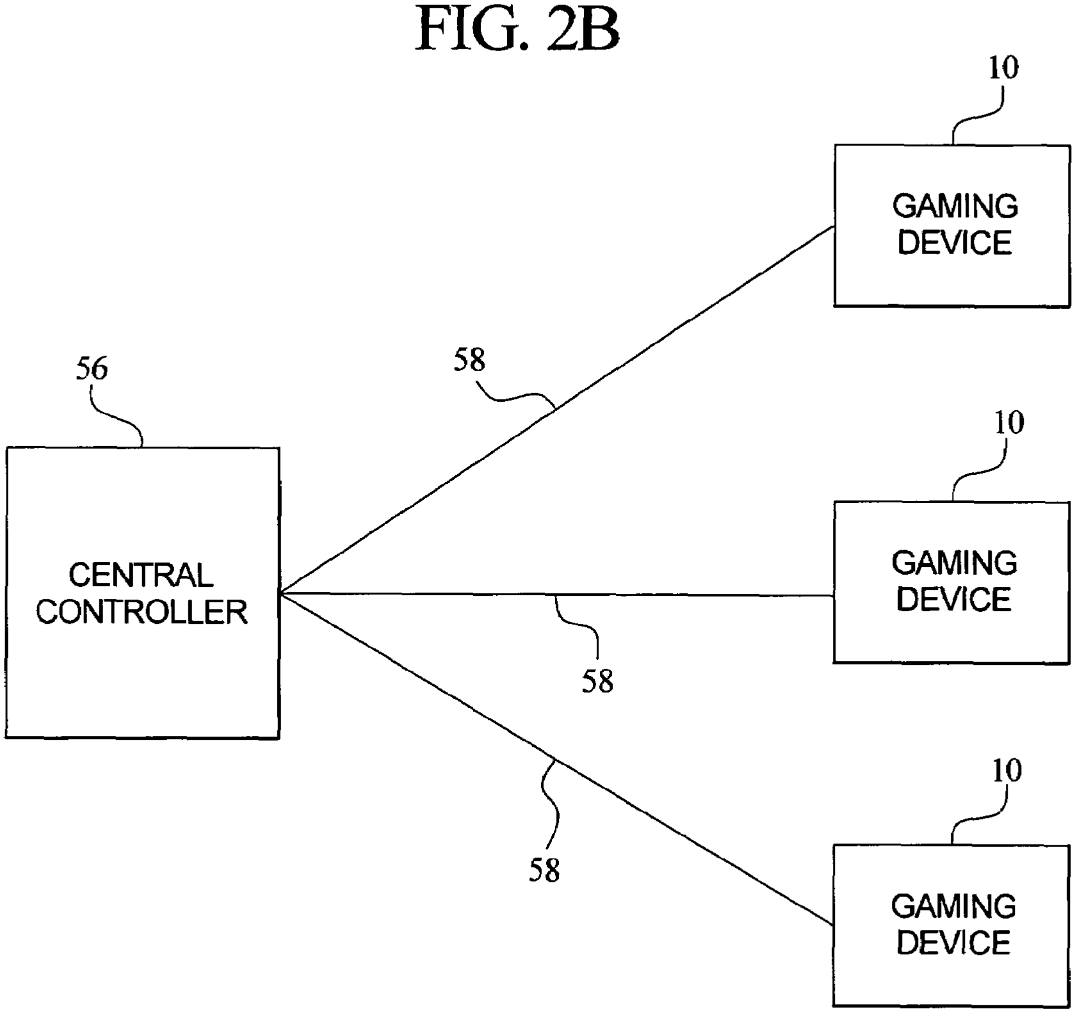
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used.

Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The reel or slot game of the present invention can be provided to the player as a primary or base game or as a secondary or bonus game. If the reel or slot game is provided as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

If the reel game of the present invention is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline 52 in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Regardless of whether the reel or slot game of the present invention is incorporated as a primary or base game or as a secondary or bonus game, the reel or slot game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of primary reels 54. As illustrated in FIGS. 1A and 1B, the gaming device includes five primary reels 54*a*, 54*b*, 54*c*, 54*d* and 54*e*. The primary reels are in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels 54 are in video form, the plurality of simulated video reels 54 are displayed on one or more of the display devices as described above. Each primary reel 54 displays a plurality of indicia or symbols 104 such as bells, hearts, fruits, numbers, letters, bars or other images which preferably correspond to a theme associated with the gaming device.

FREE ENHANCED PAYLINE EMBODIMENT

Figure 3A:
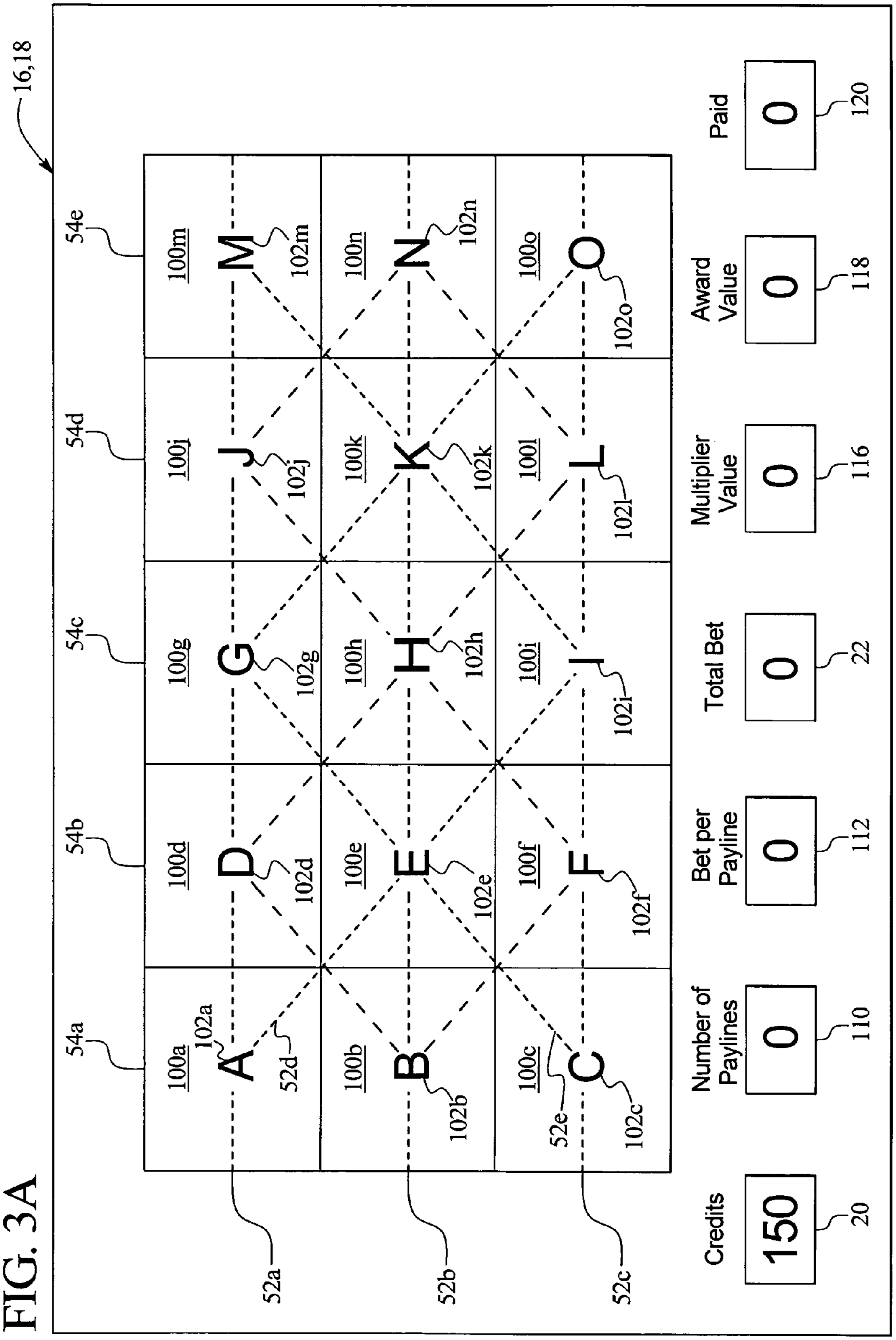
FIGS. 3A, 3B, 3C and 3D are front views of one embodiment of the present invention illustrating a free payline which enhances the award associated with activated paylines.

Referring now to FIGS. 3A to 3D, in one embodiment of the present invention, at least one free enhanced payline is added to the plurality of base paylines which are wagered upon by the player in a game. FIG. 3A illustrates one embodiment of the present invention which includes five reels 54*a*, 54*b*, 54*c*, 54*d* and 54*e* displayed by the display 16, 18 of the gaming device 10. Each of the reels includes a plurality of symbols such as displayed symbols represented by the letters A 102*a*, B 102*b*, C 102*c*, D 102*d*, E 102*e*, F 102*f*, G 102*g*, H 102*h*, I 102*i*, J 102*j*, K 102*k*, L 102*l*, M 102*m*, N 102*n* and O 102*o*. A plurality of symbol display positions 100*a* to 100*o* are associated with the reels 54. In the embodiment illustrated in FIG. 3A, symbol display positions 100*a*, 100*b*, and 100*c* are associated with reel 54*a*; symbol display positions 100*d*, 100*e*, and 100*f* are associated with reel 54*b*; symbol display positions 100*g*, 100*h*, and 100*i* are associated with reel 54*c*; symbol display positions 100*j*, 100*k*, and 100*l* are associated with reel 54*d*; and symbol display positions 100*m*, 100*n* and 100*o* are associated with reel 54*e*. It should be appreciated that the present invention can include a matrix or arrangement of symbol display positions of any suitable size or configuration where symbols are displayed.

The reels display the plurality of symbols at the symbol display positions. In the gaming device illustrated in FIG. 3A, letter symbols A 102*a*, B 102*b*, C 102*c* are displayed at symbol display positions 100*a*, 100*b*, and 100*c*, respectively, on reel 54*a*; letter symbols D 102*d*, E 102*e* and F 102*f* are displayed at symbol display positions 100*d*, 100*e* and 100*f*, respectively, on reel 54*b*; letter symbols G 102*g*, H 102*h* and I 102*i* are displayed at symbol display positions 100*g*, 100*h* and 100*i*, respectively, on reel 54*c*; letter symbols J 102*j*, K 102*k* and L 102*l* are displayed at symbol display positions 100*j*, 100*k* and 100*l*, respectively, on reel 54*d*; and letter symbols M 102*m*, N 102*n* and O 102*o* are displayed at symbol display positions 100*m*, 100*n* and 100*o*, respectively, on reel 54*e*. It should be appreciated that the gaming device can include any suitable number of symbols, and the symbols can include any suitable character, numeral, indicia, or image(s).

The embodiment illustrated in FIG. 3A also includes a plurality of base paylines available to the player to be activated based on the wager(s) by the player. In one embodiment, each base payline is defined by or associated with one symbol display position from each reel. In one embodiment, each base payline is associated with a different group of symbol display positions. For example, as illustrated in FIG. 3A, payline 52*a* is associated with symbol display positions 100*a* from reel 54*a*, 100*d* from reel 54*b*, 100*g* from reel 54*c*, 100*j* from reel 54*d* and 100*m* from reel 54*e*. Payline 52*b* is associated with symbol display positions 100*b* from reel 54*a*, 100*e* from reel 54*b*, 100*h* from reel 54*c*, 100*k* from reel 54*d* and 100*n* from reel 54*e*. Payline 52*c* is associated with symbol display positions 100*c* from reel 54*a*, 100*f* from reel 54*b*, 100*i* from reel 54*c*, 100*l* from reel 54*d* and 100*o* from reel 54*e*. Payline 52*d* is associated with symbol display positions 100*a* from reel 54*a*, 100*e* from reel 54*b*, 100*i* from reel 54*c*, 100*k* from reel 54*d* and 100*m* from reel 54*e*. Payline 52*e* is associated with symbol display positions 100*c* from reel 54*a*, 100*e* from reel 54*b*, 100*g* from reel 54*c*, 100*k* from reel 54*d* and 100*o* from reel 54*e*. It should be appreciated that other paylines can be defined by or associated with the symbol display positions.

It should be further appreciated that the gaming device can use any suitable method of displaying or arranging the symbol display positions to define any suitable number of paylines including linear and non-linear arrangements. For example, the paylines may be defined using a matrix with a different number of columns and rows of symbol display positions. The paylines can also be defined using any suitable number or location of symbol display positions such as a scatter pay. Furthermore, each symbol display position can be associated with one or more or no paylines.

Play of one embodiment of the present invention begins with the player initializing the credits by depositing money in the manner discussed above to accrue the appropriate number of playing credits on the total credit display 20. In FIG. 3A, the player initializes one-hundred fifty credits as indicated by the total credits display 20. More credits may be initialized, if necessary, by additional deposits of money.

In one embodiment of the present invention, upon initializing at least one credit in the gaming device, the gaming device displays to the player all paylines available to be activated as indicated by the broken lines in FIG. 3A. Base paylines are activated based on the wager(s) by the player. The player sets the wager by determining the number of paylines to be activated and by setting the bet per base payline as indicated in the number of paylines display 110 and the bet per payline display 112. To set the bet per base payline 52, the player can use the bet one button 36 to place a wager on a base payline 52.

In one embodiment, the player activates at least one payline by selecting any of the available base paylines and placing a wager on each selected payline. In one embodiment, the same amount is wagered on each base payline 52. Of the one-hundred fifty credits available to the player illustrated in FIG. 3A, the player wagers ten credits on each of five paylines as indicated by the bet per payline display 112 and number of paylines display 110 in FIG. 3B. Alternatively, the amount wagered on at least two base paylines can be different. The player may use the bet max button or input (not shown) to place the maximum bet per base payline on all base paylines 52. The gaming device may also include additional inputs enabling the player to select from different numbers of paylines and different amounts of credits per payline.

The paylines can be individually selected by the player or selected in groups (such as one payline, three paylines, five paylines, nine paylines, fifteen paylines, etc). In one embodiment, the base paylines are selected in a predetermined order. For example, the first base payline selected is always payline 52*a*, the second base payline selected is always payline 52*b*, etc. It should be appreciated, however, that any suitable order of activation of base paylines can be assigned to each incremental increase in the wager by the player.

Figure 3B:
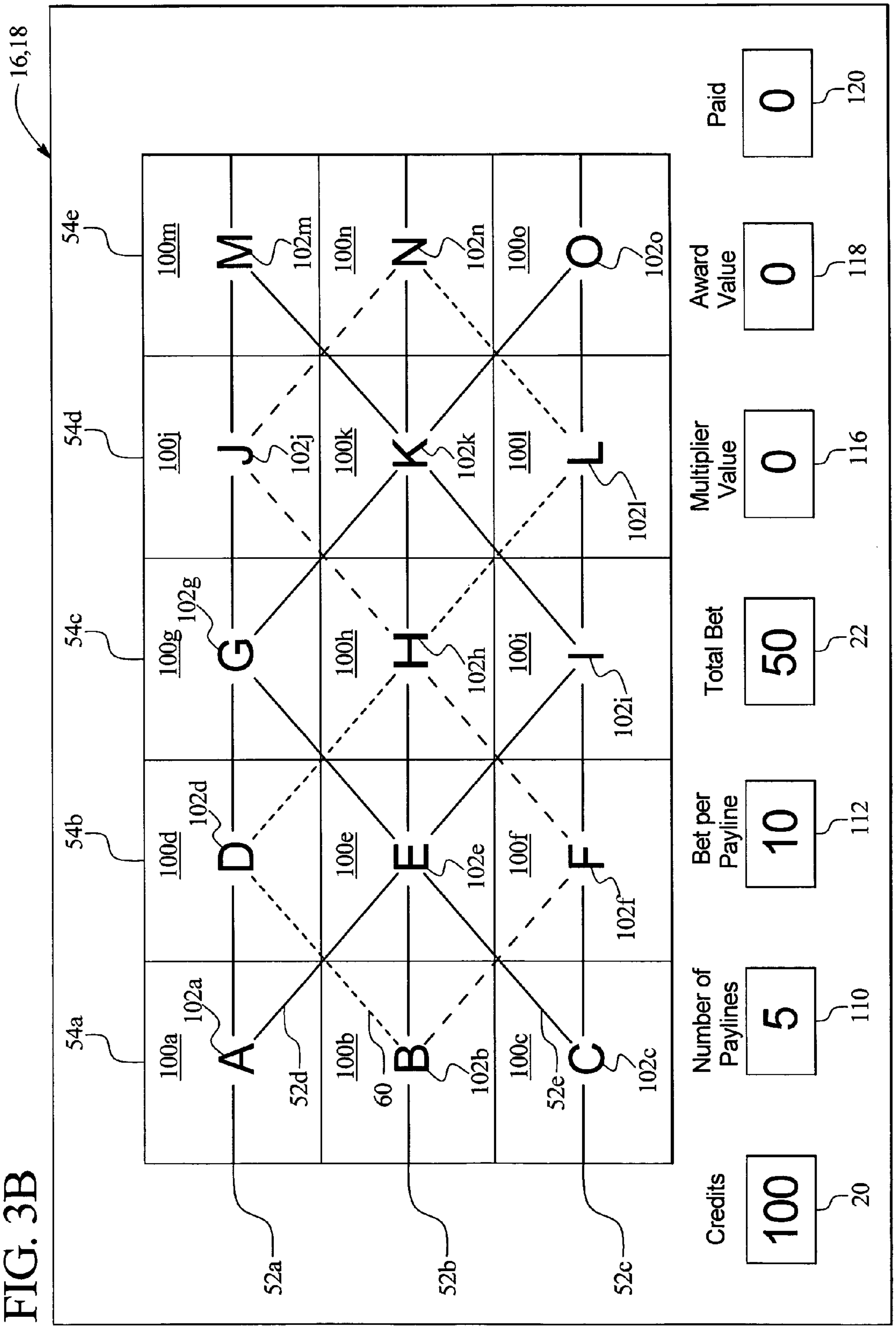

In FIG. 3B, of the possible paylines available to the player to be activated in FIG. 3A, five base paylines 52*a*, 52*b*, 52*c*, 52*d*, and 52*e* are activated indicated by the solid lines in FIG. 3B. Accordingly, the number of paylines display 110 indicates five activated base paylines. The player wagers ten credits on each of the five base paylines as indicated in the bet per payline display 112. The total amount of the wager is calculated by multiplying the number of selected base paylines by the bet per base payline for a total bet of fifty credits indicated by the total bet display 22. This leaves a balance of one-hundred total credits as indicated by the credits display 20.

It should be appreciated that the present invention can include any suitable method of indicating the selected base paylines, including text, numbers, colors, and/or sound. In one embodiment, the game displays the amount wagered on the base paylines. Small numbers indicating the base payline wager may be placed in the bottom right-hand corner of each base payline. Alternatively, the game may not display the amount wagered on the base paylines, but instead describe the method used to determine the wager amount in a separate paytable or help screen.

Figure 3C:
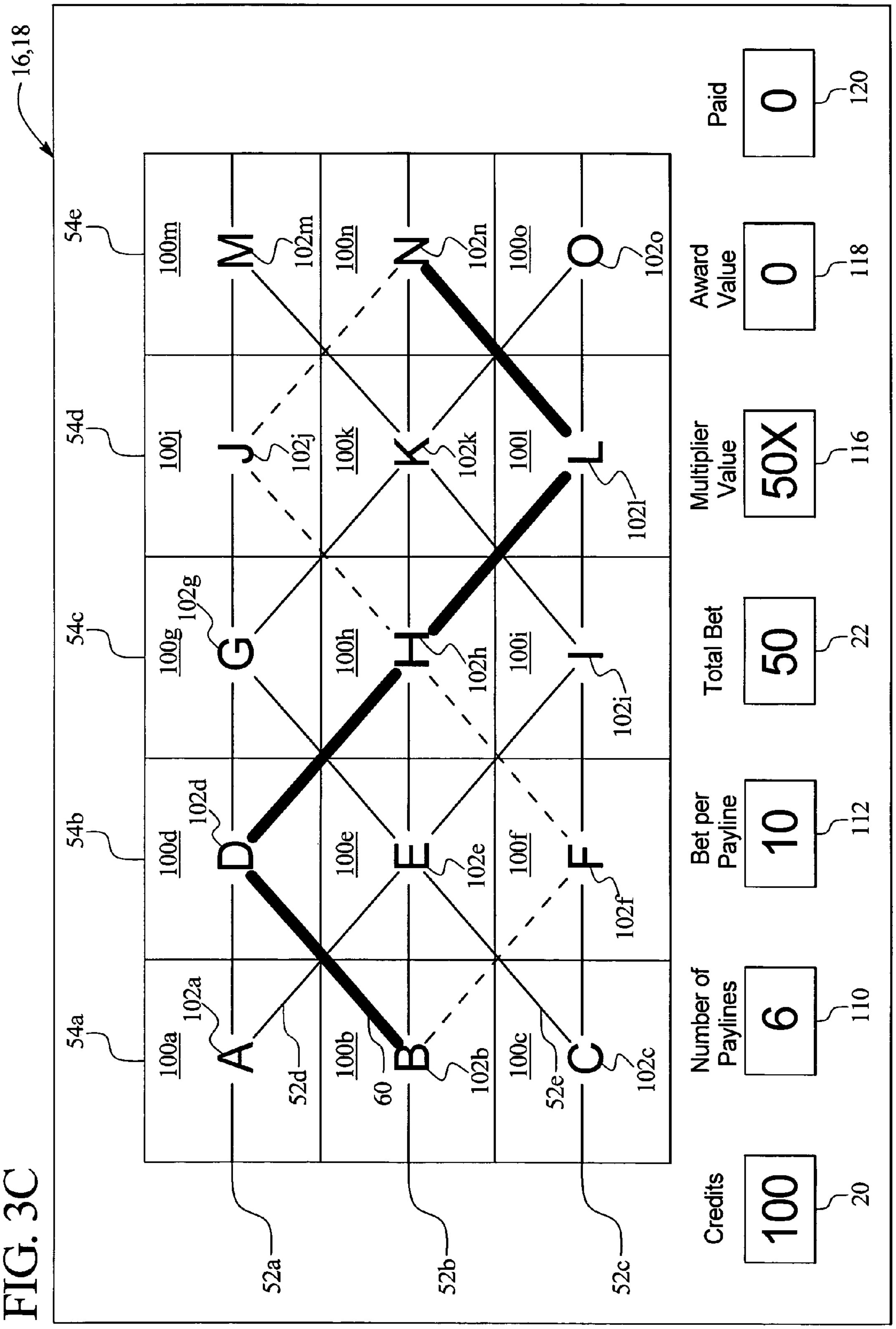

FIG. 3C illustrates one embodiment of the present invention which includes the display of a free enhanced payline 60 upon the activation of paylines 52*a*, 52*b*, 52*c*, 52*d* and 52*e* by the player. In one embodiment, at least one free enhanced payline is activated if a predetermined amount of a wager is made by the player such as bet max. Alternatively, at least one free enhanced payline is activated if at least one predetermined base payline is activated. Further, at least one free enhanced payline is activated if a predetermined number of base paylines are activated. In one embodiment of the present invention the gaming device selects the free enhanced payline. In an alternative embodiment, the gaming machine enables the player to select the free enhanced payline. It should be appreciated that any suitable method can activate at least one free enhance payline. It should also be appreciated that the present invention can include any suitable number of base and/or free enhanced paylines.

In FIG. 3C, the free enhanced payline 60 is associated with symbol display position 100*b* on reel 54*a*, symbol display position 100*d* on reel 54*b*, symbol display position 100*h* on reel 54*c*, symbol display position 100*l* on reel 54*d* and symbol display position 100*n* on reel 54*e*. The free enhanced payline 60 is free because the player has not wagered any additional credits to activate that payline. The free enhanced payline is enhanced because an award associated with any winning combination generated along a payline is increased by a predetermined amount.

In one embodiment, the base paylines and free enhanced paylines are defined using a single symbol matrix. It should be appreciated that the present invention can include any suitable number of symbol matrices to define the base paylines and the free enhanced paylines. For example, the base paylines and free enhanced paylines may be defined using one symbol matrix for the base paylines and another symbol matrix for the free enhanced paylines.

In one embodiment, the free enhanced payline may be enhanced by a modifier such as a multiplier. The modifier can include multiplying some or all winning combinations. The modifier can include adding a fixed number of credits to some or all winning combinations. It should be appreciated that the present invention can include any suitable method of enhancing the free payline awards. It should also be appreciated that the present invention can include any suitable number of enhancements to a free payline award. For example, a free enhanced payline may be enhanced by two or more multipliers.

In one embodiment, the gaming device sets the modifier such as the multiplier for the free enhanced payline 60. In one embodiment, the value of the modifier associated with the free enhanced payline is based on the number of credits wagered on each of the base paylines in the game. For example, if the multiplier value is based on the ten-credit wager on each of the base paylines, a multiplier of 10× is used to enhance the award(s) generated on at least one of the paylines.

In the illustrated embodiment, the value of the modifier associated with the free enhanced payline is based on the total number of credits wagered on all of the base paylines in the game. In FIG. 3C, for example, the multiplier value is based on the fifty-credit wager on the base paylines by the player. Therefore, the multiplier value display 116 indicates a multiplier of 50×.

Alternatively, the value of the enhancement feature of the free enhanced payline in the game is based on both the number of free enhanced paylines provided to the player and the credits wagered on the base paylines in the game. For example, the ten credits wagered by the player on each of the five activated base paylines is also assigned to the free enhanced payline to determine the value of the modifier. Therefore, six paylines, including the free enhanced payline, having ten credits per payline produce a multiplier with a value of 60× rather than 50×.

In one embodiment, an algorithm sets the multiplier value as a function or percentage of the total bet placed on the base paylines. For example, fifty percent of the total bet may be assigned to the multiplier resulting in the multiplier value equaling half the total bet. In one embodiment, the algorithm sets the multiplier value as one hundred percent of the total bet placed on the base paylines. Thus, a wager of fifty credits on the activated base paylines sets the multiplier at 50×. In an alternative embodiment, an algorithm sets the modifier value as a function of the bet placed per base payline. For example, if the algorithm sets the multiplier value as fifty percent of the bet placed per payline, a wager of ten credits per payline, sets the multiplier value at 5×. It should be appreciated that, in any of the embodiments discussed above, the player can affect the value of the modifier by increasing or decreasing the total bet. For example, increasing the total bet in the arrangement of FIG. 3B to two-hundred fifty, increases the multiplier value to 300× (which is 250× for each base activated payline plus the 50× for the activated free payline).

In one embodiment, a determination of distribution of the wager among the free enhanced paylines, includes an equal, fixed, variable, or randomly determined percentage of the total bet. For example, the gaming device may randomly assign 12% of the total bet to one free enhanced payline and 8% to another free enhanced payline. It should be appreciated that the present invention can include any suitable other method of determining the wager placed on the free enhanced paylines, including a fixed, variable or randomly determined percentage of the total bet. For example, the gaming device may assign 12% of the total bet to one free enhanced payline and 8% to another free enhanced payline.

Figure 3D:
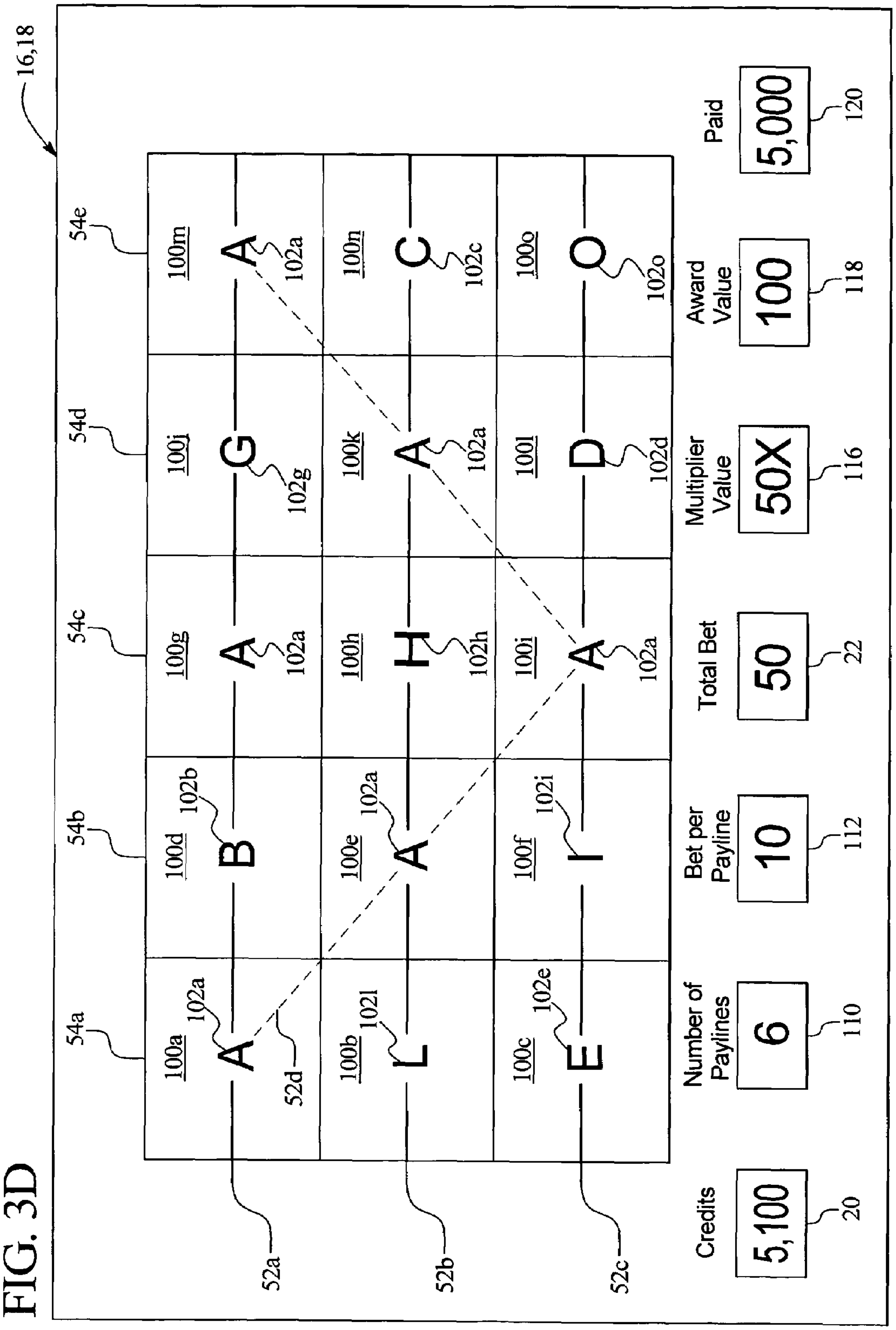

In FIG. 3D, five A symbols 102*a* comprising a winning combination are generated and displayed at symbol display positions along the free enhanced payline 60. The symbols displayed at the symbol display positions associated with the base paylines 52*a*, 52*b*, 52*c*, 52*d* and 52*e* and the free enhanced payline 60 are randomly generated. It should be appreciated, however, that any suitable method may be used to generate the symbols and to display the symbols.

The player receives awards, if any, for winning combinations formed at symbol display positions along base paylines according to at least one paytable. The example paytables illustrated in FIG. 4A and 4B list awards associated with winning symbol combinations displayed along a payline. As illustrated in FIGS. 4A and 4B, in one embodiment of the present invention, the gaming device determines if a winning symbol combination is generated at symbol display positions along any of the base paylines and the free enhanced payline according to at least one paytable. For example, a paytable for all base or free enhanced paylines may include awards for any combination of three or more "A," "B," "C," etc. symbols. In one embodiment, all winning combinations must appear at symbol display positions along a selected base payline or the free enhanced payline starting from the leftmost symbol display position on the payline. It should be appreciated that a paytable may illustrate awards corresponding to any suitable number of the same or different symbols, with such symbols appearing in any order and/or in any location at symbol display positions along a payline as defined by a paytable.

According to the example paytable 160*a* illustrated in FIG. 4A, five A symbols 102*a* correspond to an award value of one hundred credits. In the example illustrated in FIG. 3C, the award value is enhanced by the multiplier associated with the free enhanced payline. Therefore, the player is provided an award of 5,000 credits (100 credits×50×). The multiplier of 50× is the total wager on the base paylines.

It should be appreciated that the present invention can include multiple different paytables with at least one paytable used for base paylines and at least one other different paytable used for the free enhanced payline(s). In one embodiment, the enhancement of the awards associated with winning combinations generated along a free enhanced payline include enhanced values in a separate paytable such as paytable 160*b* illustrated in FIG. 4B assigned to the free enhanced payline. It should be further appreciated that multiple different paytables may be used between base paylines and/or between free enhanced paylines.

The present invention includes base and/or free enhanced payline awards or bonus features of any suitable type or amount of award, including: credits, such as a fixed number of credits range of credits, or random amount of credits; award enhancement modifiers such as a multiplicative factor for credits won; a wild feature such as wild symbol appearing in a symbol display position; one or more free spins of the slot reels, with or without an enhanced paytable; cash, products, services, prizes; or any other award of value or combination thereof. In addition, award types may vary between base and/or free enhanced paylines within the same game. For example, a base payline may issue an award of free spins, another base payline may issue prizes, and a free enhanced payline may issue credits. It should also be appreciated that the present invention can include base and/or free enhanced payline awards of any amount of credits, free spins, award enhancements, multipliers, prizes, products, and/or services. For example: a free enhanced payline may issue an award of ten times the bet per line. Further, award amounts or types may vary from symbol to symbol. For example, a free enhanced payline award using "E" symbols may issue ten times the bet per line, "F" symbols may issue five times the total bet, and "G" symbols may issue three times the total bet and three free spins.

One embodiment of the present invention includes separate base paylines and free enhanced paylines, each having the same frequencies of wins and losses as the base paylines. Alternatively, the probability of generating a winning combination along the free payline can be different from the probability of generating a winning combination on other paylines.

In one embodiment, winning symbol combinations at symbol display positions along a base and/or free enhanced payline are highlighted or indicated to draw the player's attention to the location of a winning combination. It should be appreciated that the present invention can include any suitable method of indicating a winning combination on a base and/or free enhanced payline including animation, growing, shrinking, boxing, circling, outlining, glowing, flashing, blinking, rotating, and/or color changing the symbols. In addition, winning combinations can be further emphasized by sound effects upon completion of the winning combination.

Referring now to FIGS. 5A, 5B, 5C and 5D, in one embodiment, the gaming device only enhances the award associated with the winning combination of symbols generated and displayed at symbol display positions along the free enhanced payline. The player receives awards, if any, for winning combinations formed on the base paylines and the free enhanced payline 60 according to a paytable such as paytables 160*a* and 160*b*, for example, in FIGS. 4A and 4B.

Figure 5A:
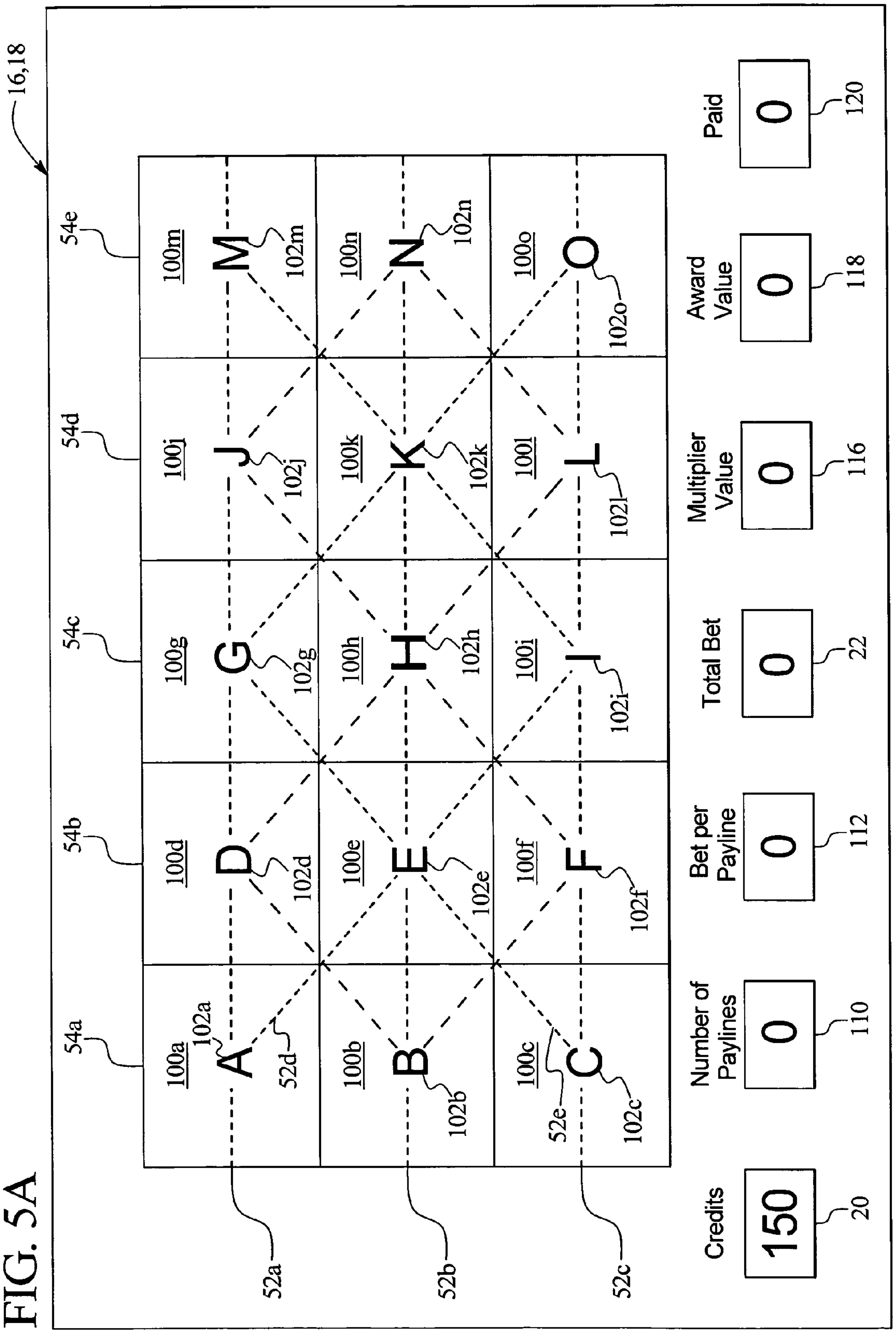
FIGS. 5A, 5B, 5C and 5D are front views of one embodiment of the present invention illustrating a free payline which enhances the award associated with the free payline.
Figure 5B:
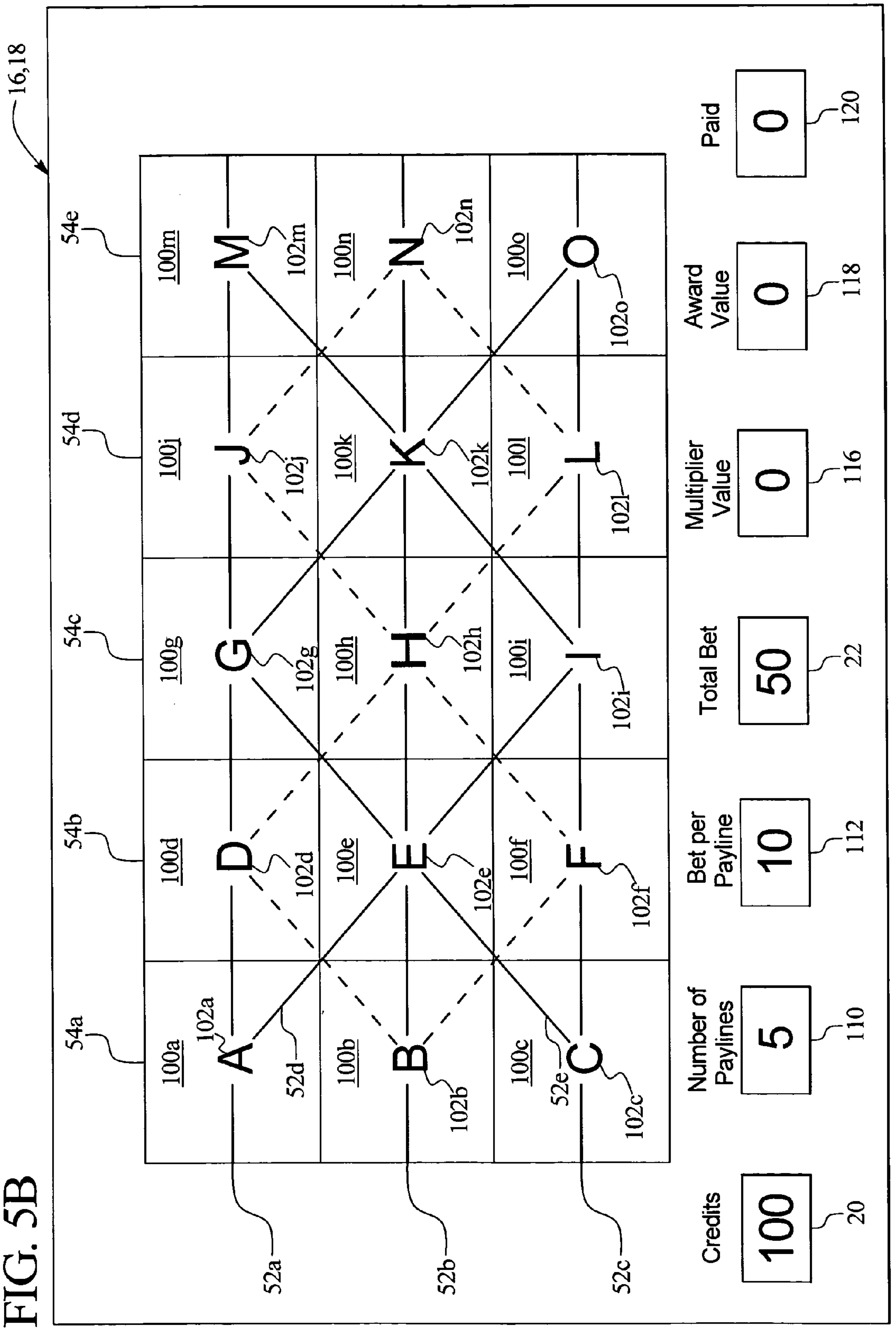
Figure 5C:
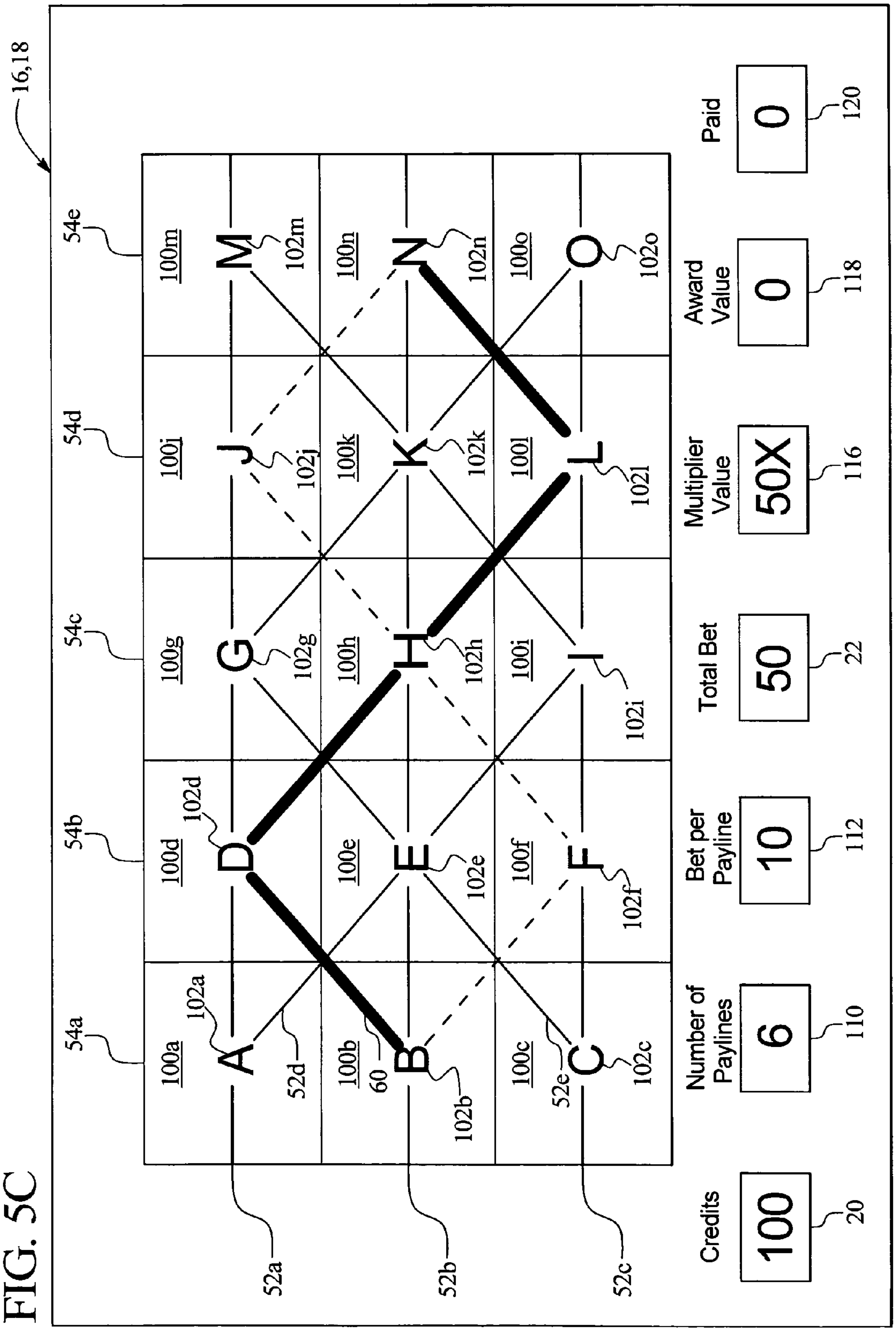

In FIG. 5B, as in FIG. 3B, the player wagers ten credits on five paylines. The game or the player selects and activates five base paylines 52*a*, 52*b*, 52*c*, 52*d* and 52*e* illustrated in FIG. 5B. Activation of at least one of the five base paylines activates a free enhanced payline 60 illustrated in FIG. 5G. The enhancement feature of the free enhanced payline includes a multiplier based on the total bet amount of fifty credits. Therefore, the multiplier to be applied to the award resulting from any winning combination of symbols generated along the active payline is 50× as indicated by the multiplier display 116.

Figure 5D:
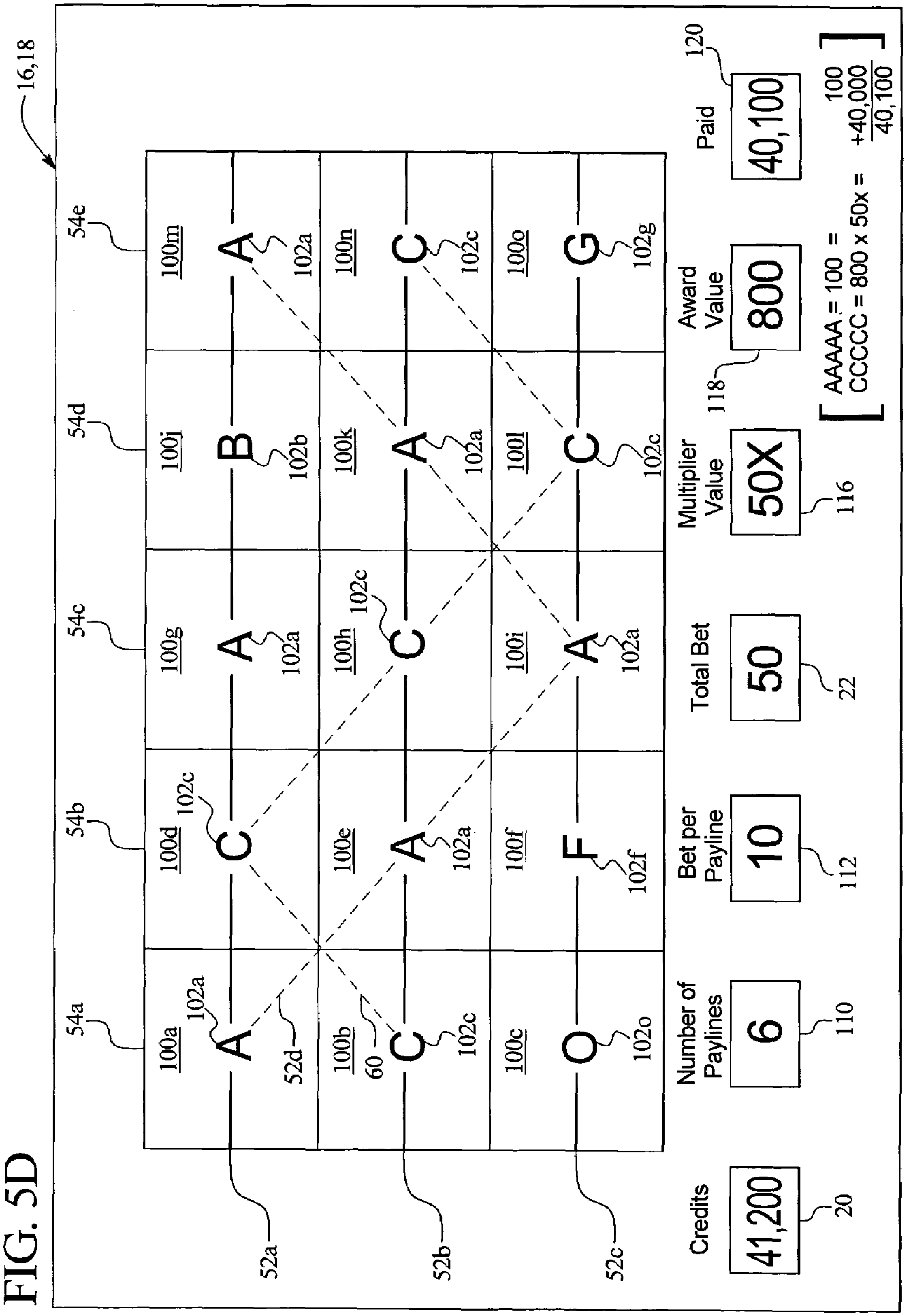

Upon activation of the reels, the symbols are rearranged in the symbol display positions. In FIG. 5D, five A symbols 102*a* are indicated along the base payline 52*d* to form a first winning combination. Additionally, five C symbols 102*c* are indicated along the free enhanced payline 60 to form a second winning combination.

In the illustrated embodiment, paytable 160*a* illustrated in FIG. 4A determines the awards associated with the winning combinations generated along base paylines. Therefore, the first winning combination generated along base payline 52*d* corresponds to an award of one hundred credits.

In the illustrated embodiment, paytable 160*b* illustrated in FIG. 4B determines the awards associated with the winning combinations generated along free enhanced paylines. Therefore, the second winning combination generated along free enhanced payline 60 corresponds to an award of eight hundred credits.

A multiplier of 50× based on the player's wager of fifty credits (ten credits on five paylines) and displayed in the multiplier display area 116 is used to enhance the winning combination displayed at symbol display positions along the free enhanced payline 60. Unlike the example illustrated in FIGS. 3A to 3C, however, the multiplier is not applied to the awards associated with winning combinations displayed at symbol display positions along other activated paylines. Therefore, the award value indicated in the award value display 118 for the winning combination of symbols generated along the free enhanced payline 60 is eight hundred credits× 50× multiplier or forty thousand credits. This value is added to the one hundred credits provided to the player for the winning combination occurring on the base payline 52*d* for a total paid amount for that spin of the reels of forty thousand one hundred credits indicated by the total paid display 120.

Following issuance of all awards, the cumulative credits are added to the player's balance of credits, if any. Hence, the credit display 20 shows the credit pool increase to 1,200 credits, as illustrated in FIG. 5D. As long as the player has credits on the credit display 20, the player may continue to play the gaming machine or collect the balance of credits by cashing out.

Referring now to FIGS. 6A, 6B, 6C and 6D, in one alternative embodiment, upon activation of at least one free enhanced payline, any winning combination of symbols generated on one or more of the wagered on activated paylines 52 in addition to the free enhanced payline 60 is enhanced. The player receives awards, if any, for winning combinations formed on the base paylines and the free enhanced payline 60 according to a paytable such as paytables 160*a* and 160*b*, for example, in FIGS. 4A and 4B.

Figure 6A:
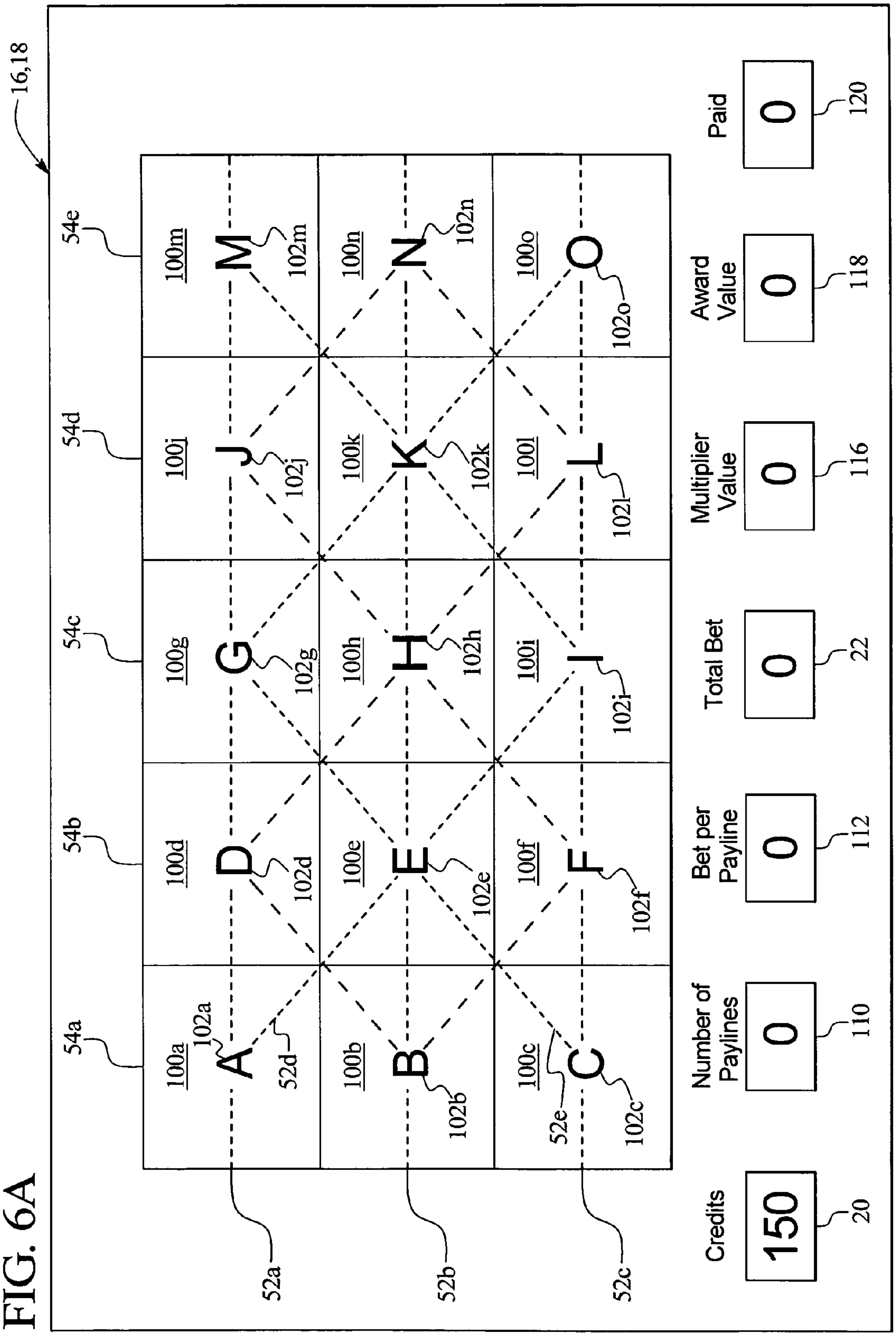
FIGS. 6A, 6B, 6C and 6D are front views of one embodiment of the present invention illustrating a free payline which enhances the award associated with the free payline but not the other activated paylines.
Figure 6B:
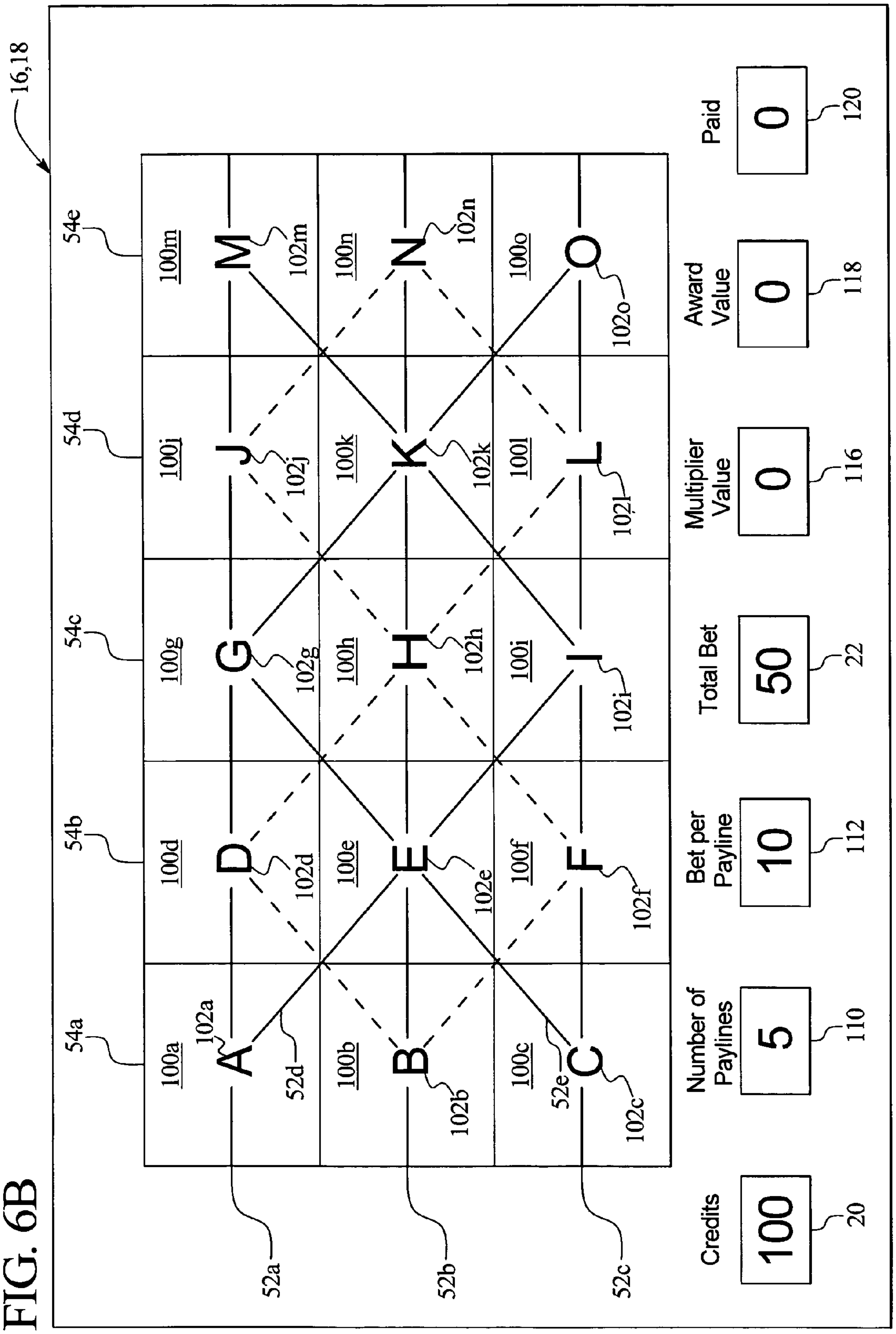
Figure 6C:
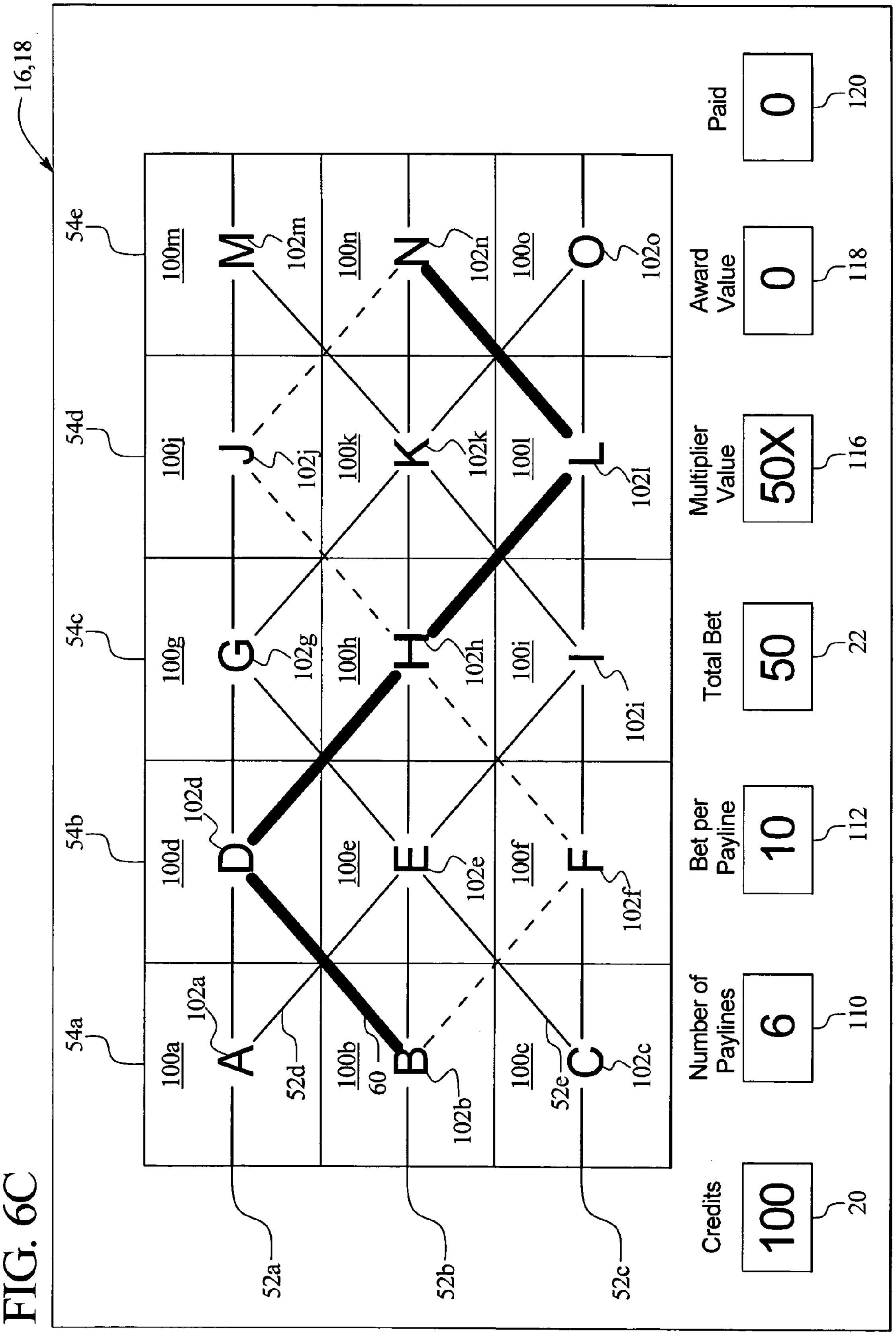

In FIG. 6B, as in FIGS. 3B and 5B, the player wagers ten credits on five paylines. The game or the player selects and activates five base paylines 52*a*, 52*b*, 52*c*, 52*d* and 52*e* illustrated in FIG. 6B. Activation of at least one of the five base paylines activates a free enhanced payline 60 illustrated in FIG. 6C. The enhancement feature of the free enhanced payline includes a multiplier based on the total bet amount of fifty credits. Therefore, the multiplier to be applied to the award resulting from any winning combination of symbols generated along the active payline is 50× as indicated by the multiplier display 116.

Figure 6D:
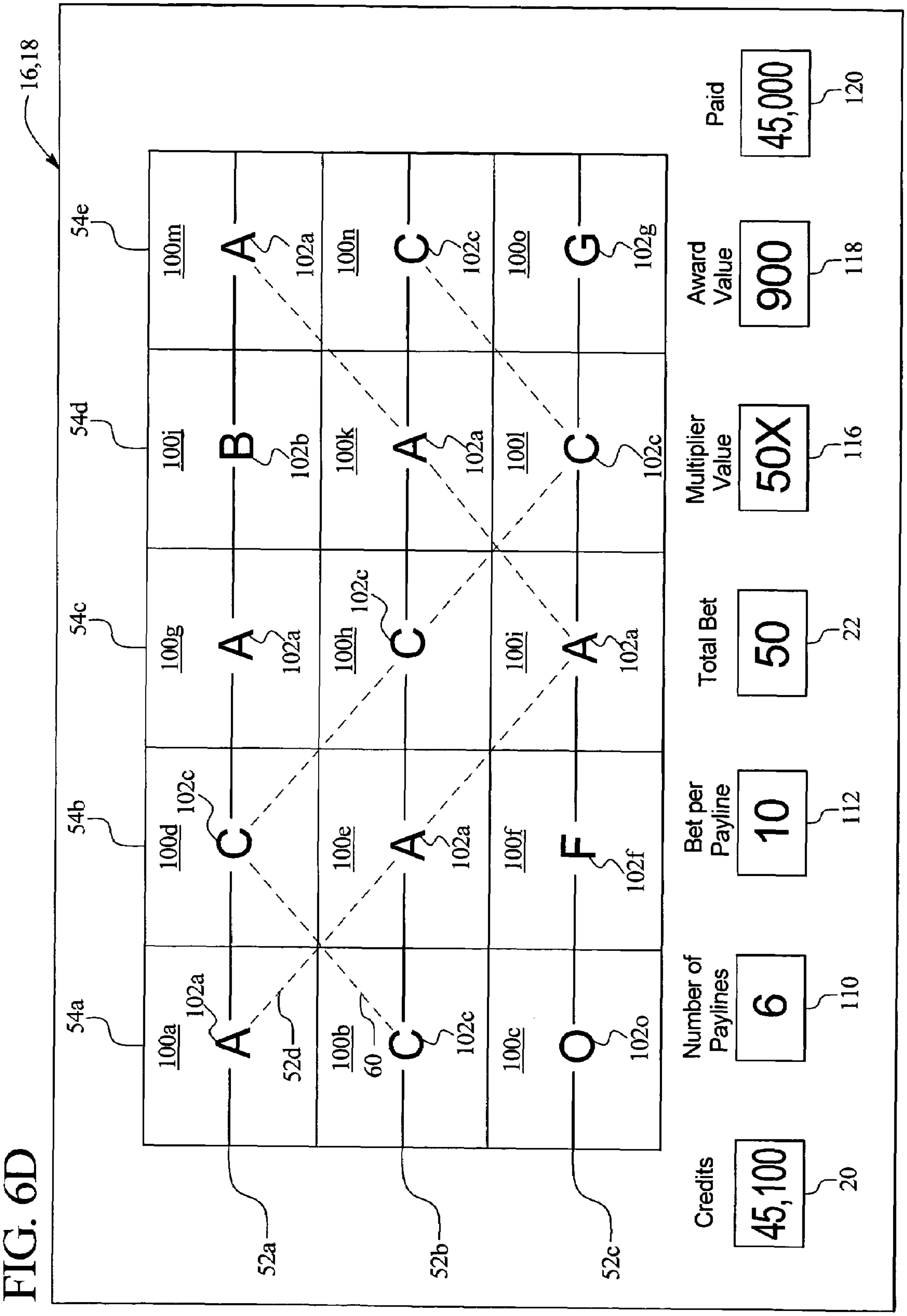

Upon activation of the reels, the symbols are rearranged in the symbol display positions. In FIG. 6D, five A symbols 102*a* are indicated along the base payline 52*d* to form a first winning combination. Additionally, five C symbols 102*c* are indicated along the free enhanced payline 60 to form a second winning combination.

In the illustrated embodiment, paytable 160*a* illustrated in FIG. 4A determines the awards associated with the winning combinations generated along base paylines. Therefore, the first winning combination generated along base payline 52*d* corresponds to an award of one hundred credits.

In the illustrated embodiment, paytable 160*b* illustrated in FIG. 4B determines the awards associated with the winning combinations generated along free enhanced paylines. Therefore, the second winning combination generated along free enhanced payline 60 corresponds to an award of eight hundred credits.

A multiplier of 50× based on the player's wager of fifty credits (ten credits on five paylines) and displayed in the multiplier display area 116 is used to enhance the winning combinations displayed at symbol display positions along the base payline 52*d* and the free enhanced payline 60. Unlike the example illustrated in FIGS. 5A to 5D, however, the multiplier is applied to the awards associated with winning combinations displayed at symbol display positions along other activated paylines. Therefore, the award value indicated in the award value display 118 for the winning combination of symbols generated along the free enhanced payline 60 is nine hundred credits (100 credits+800 credits)×50×multiplier or forty-five thousand credits as indicated by the total paid display 120.

Following issuance of all awards, the cumulative credits are added to the player's balance of credits, if any. Hence, the credit display 20 in FIG. 6D shows the credit pool increase to 45,100 credits. As long as the player has credits on the credit display 20, the player may continue to play the gaming machine or collect the balance of credits, thereby cashing out.

Referring now to FIGS. 7A and 7B, in one embodiment, the game uses a payline display area 260 to display a number of base and free paylines defined by a symbol matrix. In FIG. 6A, the paylines are displayed to the player in a payline display area 260 comprised of five columns. A first column 262 displays ten base paylines 262*a-j*, a second column 264 displays ten base paylines 264*a-j*, a third column 266 displays ten base paylines 266*a-j*, a fourth column 268 displays ten base paylines 268*a-j*, and a fifth column 270 displays ten base paylines 270*a-j*. In addition, the payline display area also illustrates the free, enhanced payline 272 below the five columns 262-270. It should be appreciated that the game can utilize any payline display area with any suitable method of displaying or arranging the base and free enhanced paylines.

In FIG. 7B, the symbol matrix includes a number and location of specific symbol display positions which define the paylines. FIG. 7B illustrates base paylines 262*a-j* through 270*a-j* and the free, enhanced payline 272 defined by a symbol matrix measuring five columns by fifty-one rows. Base paylines 262*a-j* through 270*a-j* and the free enhanced payline 272 are comprised of five symbols from five specific symbol display positions in the underlying symbol matrix. As illustrated in FIG. 7B, the fifty base paylines 262*a-j* through 270*a-j* are associated with the symbol display positions listed for paylines 1 to 50; the free enhanced payline are associated with the symbol display positions listed for payline 51. As provided herein, symbol display positions are identified by their column, from left to right, and their row, from top to bottom. For example, symbol display position in the first row of the first column is located in the leftmost column, topmost row. It should be appreciated that the underlying symbol matrix may be shown to the player instead of the payline display area or in addition to the payline display area.

One embodiment of the present invention includes separate base paylines and free enhanced paylines, each having the same frequencies of wins and losses as the base paylines. Alternatively, the probability of generating a winning combination along the free payline can be different from the probability of generating a winning combination on other paylines.

It should also be appreciated that the present invention can include using the base and/or free enhanced paylines in the primary slot game and/or as a secondary or bonus game. For example, a free enhanced payline may be used as a bonus game but not during the primary game. In addition, the present invention may also use different numbers of base and/or free enhanced paylines during the primary game and bonus game. For example, a single free, enhanced payline may be used during the primary game and three free, enhanced paylines may be used during the bonus game.

FREE ENHANCED POKER HAND EMBODIMENT

It should be appreciated that providing a player free potential winning combinations can be applied to other types of games such as a poker game. Therefore, referring to FIGS. 8A to 8E, in one embodiment of the present invention, at least one free poker hand is provided to a player for wagering on at least one poker hand, wherein the player does not have to wager on the free hand to play that hand. Accordingly, the features described above in the context of the free enhanced payline embodiment can be applied to a poker game as discussed below and are incorporated herein.

Figure 8A:
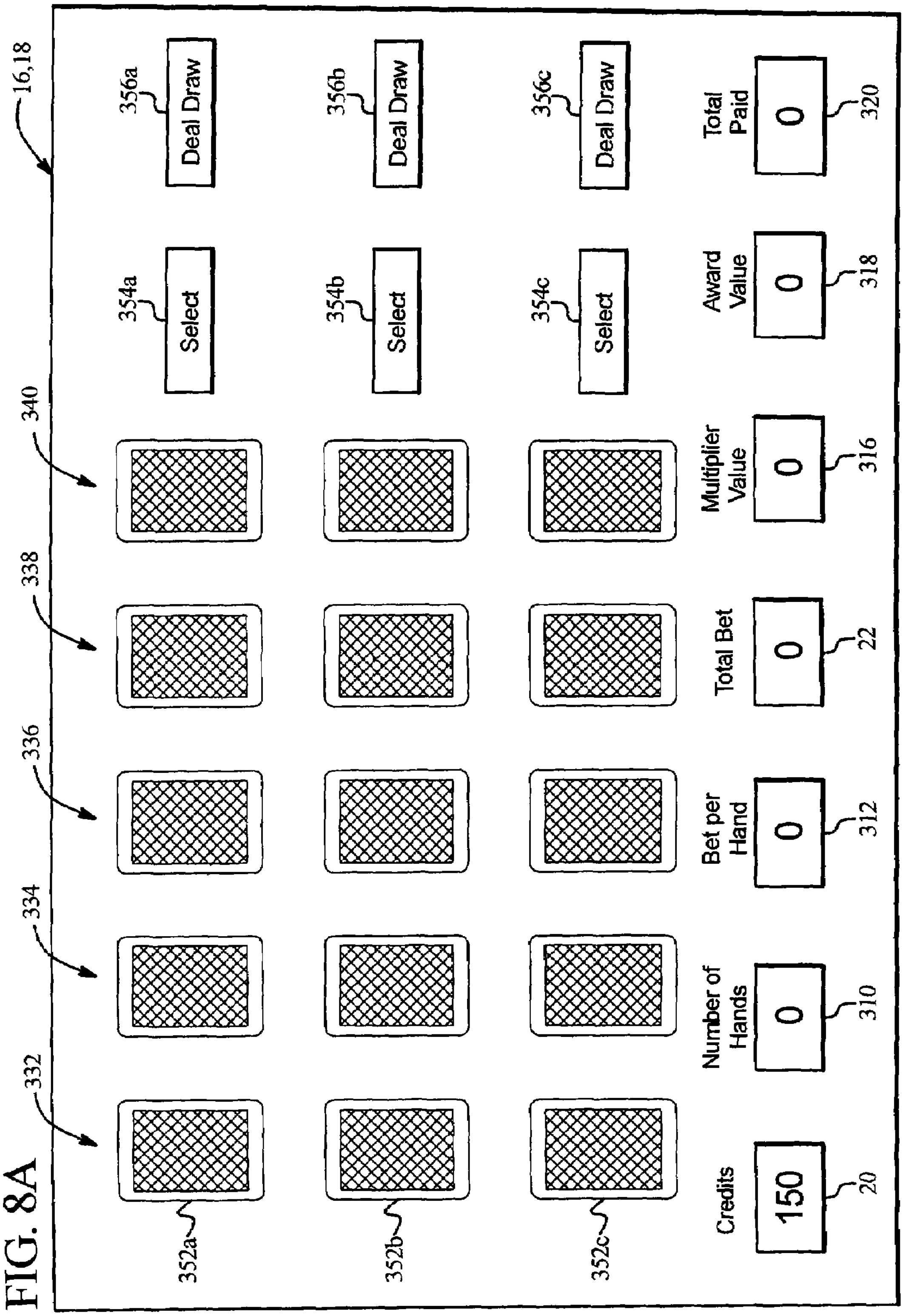
FIGS. 8A, 8B, 8C 8D and 8E are front views of one embodiment of the present invention illustrating a free poker hand which enhances the award associated with winning hands.

In one embodiment, a free hand of cards is provided to a player if the player wagers on a predetermined number of hands in a poker game. In FIG. 8A, the gaming device displays three poker hands 352*a*, 352*b* and 352*c* to a player. Each poker hand includes five hidden cards in five card positions 332, 334, 336, 338 and 340. It should be appreciated that the gaming device can include different numbers of cards or card positions.

Figure 8B:
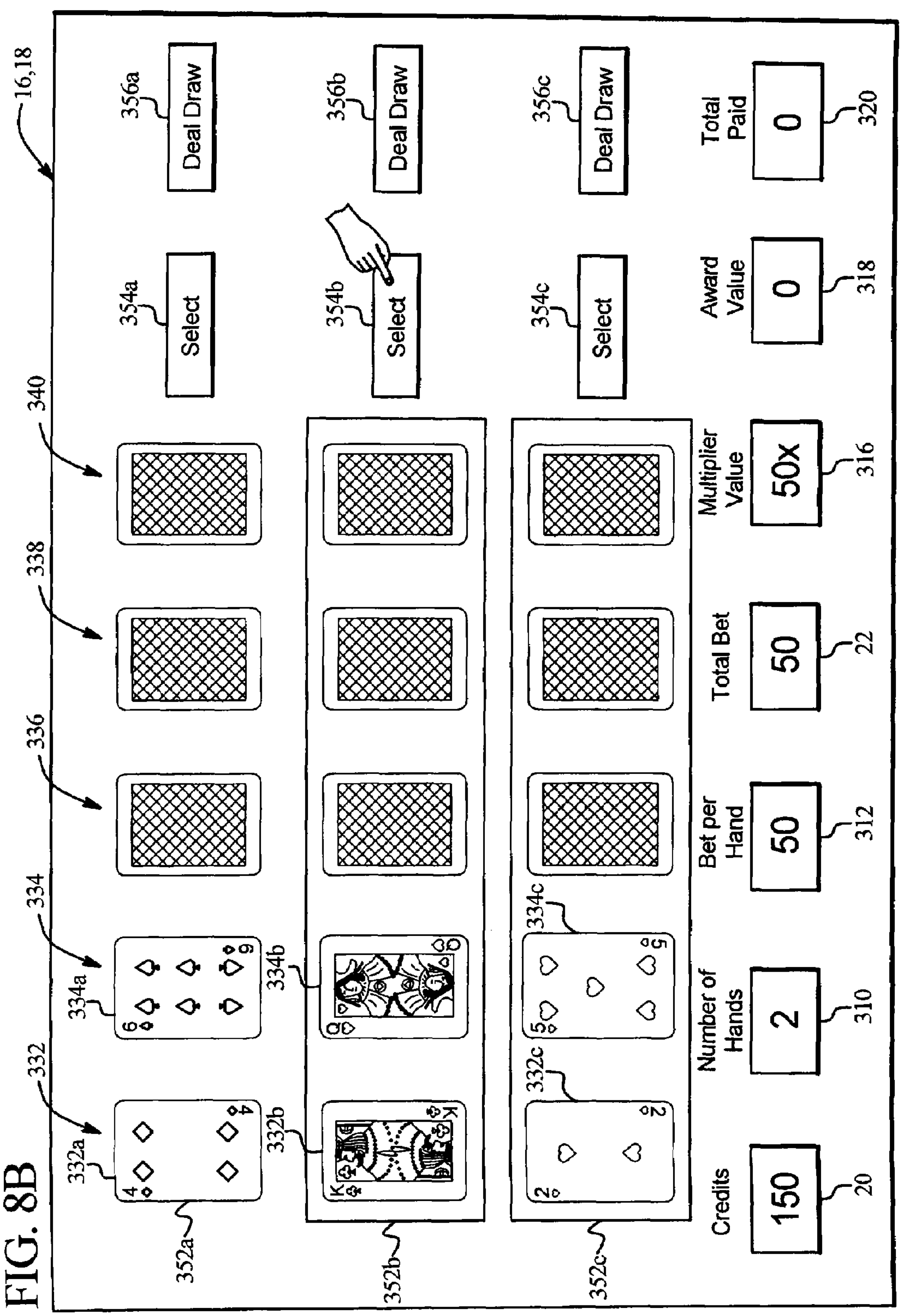

In one embodiment, each card of a hand remains hidden until the player wagers on the hand and the cards in that hand are dealt to the player. Alternatively, the gaming device reveals at least one, but not all, of the cards of a hand before a wager is placed on any hand. As illustrated in FIG. 8B, two cards in each hand displayed to the player are revealed to the player before a wager is placed on the hand. It should be appreciated that the remaining hidden cards in the activated hands can be randomly generated upon selection of the hand, predetermined upon activation of the gaming device upon a wager or generated in any other suitable method.

The player wagers fifty credits of the one hundred fifty credits, as illustrated in the bet per hand display 312 in FIG. 8B, and selects the select button 354 corresponding to the hand the player wishes to play, referred to herein as the wager hand. By selecting the select button 354*b*, as illustrated in FIG. 8B, the player picks wager hand 352*b* that includes a King of Clubs 332*b* and Queen of Hearts 334*b* already revealed to the player.

Upon placing a wager on at least one poker hand, in one embodiment, the gaming device allows the player to play at least one other hand without requiring a wager to be placed on that poker hand, referred to herein as the free hand. In the illustrated embodiment, the gaming device picks another displayed poker hand 352*c* as a free hand. Thus, as illustrated in FIG. 8B, the number of hands display 310 displays a value of two. Alternatively, the player is enabled to pick at least one of the other poker hands as a free hand.

Figure 8C:
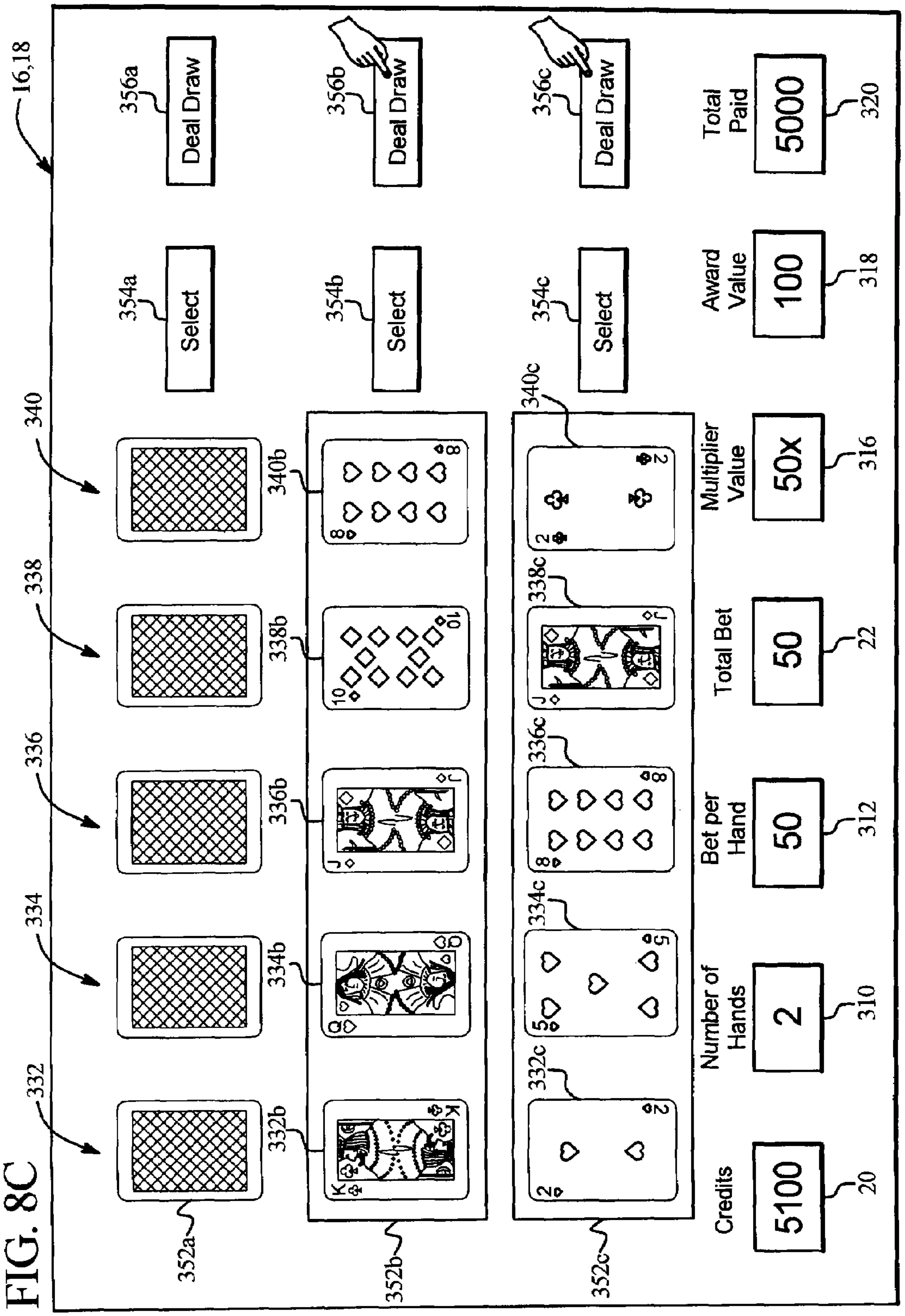

In FIG. 8C, the gaming device reveals the remaining hidden cards in the wager hand and the free hand by pushing the deal/draw buttons 356*b* and 356*c*, respectively. In one embodiment, the remaining hidden cards in the wager hand and the free hand are generated from independent decks of cards. In one embodiment, each wager hand and each free hand includes cards from its own independent deck. In one embodiment, the remaining hidden cards in the wager hand and the free hand are generated from decks of cards with the same number of card ranks and suits as the wager hands. Alternatively, the remaining hidden cards are generated from different decks of cards having different card ranks or suits. For example, the wager hands may include cards generated from one or more traditional decks of cards whereas the free hands include cards generated from one or more modified decks of cards having different card ranks or suits. As illustrated in FIG. 8C, the remaining cards in the wager hand are generated from a deck of cards independent from the deck of cards from which the remaining cards in the free hand are generated as evidenced by the Eight of Hearts 340*b* and 336*c* in each of the wager hand and free hand, respectively. It should be appreciated that, in an embodiment wherein no cards are revealed to the player prior to placing a wager on the hand, all of the cards in a hand can be associated with the same or different, modified or un-modified decks of cards.

In FIG. 8C, a Jack of Diamonds 336*b*, a Ten of Diamonds 338*b* and an Eight of Hearts 340*b* are revealed to the player in the wager hand 352*b* in addition to the King of Clubs 332*b* and Queen of Hearts 334*b*. Similarly, an Eight of Hearts 336*c*, Jack of Diamonds 338*c* and a Two of Clubs 340*c* are revealed to the player in the free hand 352*c* in addition to the Two of Hearts 332*c* and Five of Hearts 334*c*.

FIGS. 9A and 9B illustrate paytables. The paytables include different winning hands, such as Royal Flush, Straight Flush, Four Aces, Full House, Flush, Straight, Three-of-a-Kind and Two Pair. It should be appreciated that other combination of cards or winning hands can be included in the paytables of the present invention. The winning hands are associated with different award values based on the amount of the wager or number of coins bet. In one embodiment, awards associated with winning hands generated in the wager hand and the free hand are defined in the same paytable as in the paytable 360 illustrated in FIG. 9A. Alternatively, different paytables can be used to define the awards associate with the winning hands of the wager and free hands. In one embodiment, the paytable associated with winning combinations generated in a free hand includes awards that are enhanced. For example, in FIG. 9B, an enhanced paytable 362 is illustrated wherein the awards are greater than the awards associated with the same winning combinations in paytable 360.

In the embodiment illustrated in FIG. 3C, the enhanced paytable 362 is associated with winning combinations generated in the free hand 352*c*. As illustrated, the Two of Hearts 332*c* and Five of Hearts 334*c* and Eight of Hearts 336*c* constitute a Three-of-a-Kind in poker. According to the enhanced paytable 362 in FIG. 9B, the award associated with a Three-of-a-Kind generated in a hand on which a wager of fifty credits is placed is one hundred credits as is indicated in the award value display 318.

In one embodiment, a free hand enhances the award associated with any winning hands generated in the free hand, wager hands or both. In one embodiment, a modifier such as a multiplier is used to enhance the award associated with the winning hands. As discussed above in the free enhanced payline embodiment, the modifier can be based on the wager per hand, the total wager, the number of hands wagered upon or any other suitable basis for the modifier. It should be appreciated that one method of enhancing the awards in an embodiment in which the awards associated with winning combinations generated in a free hand are enhanced, includes providing a paytable with enhanced awards as in FIG. 9B. It should be further appreciated that each of the methods of enhancing an award can be used alone or in combination with other methods.

In FIG. 8C, the modifier is a multiplier. The multiplier is determined based on the amount of the wager as indicated in the total bet display 22. Because the player wagers fifty credits, a multiplier of 50×, as illustrated in the multiplier value display 316, is provided to the player to enhance the awards associated with any winning combinations generated in the hands. An award value of one hundred credits is generated as discussed above. Therefore, the 50× multiplier is used to enhance that award to five thousand credits (100 credits×50×) as indicated in the total paid display 320. The credits display 20 is then updated to include the additional five thousand credits for a total of five thousand one hundred credits.

Figure 8D:
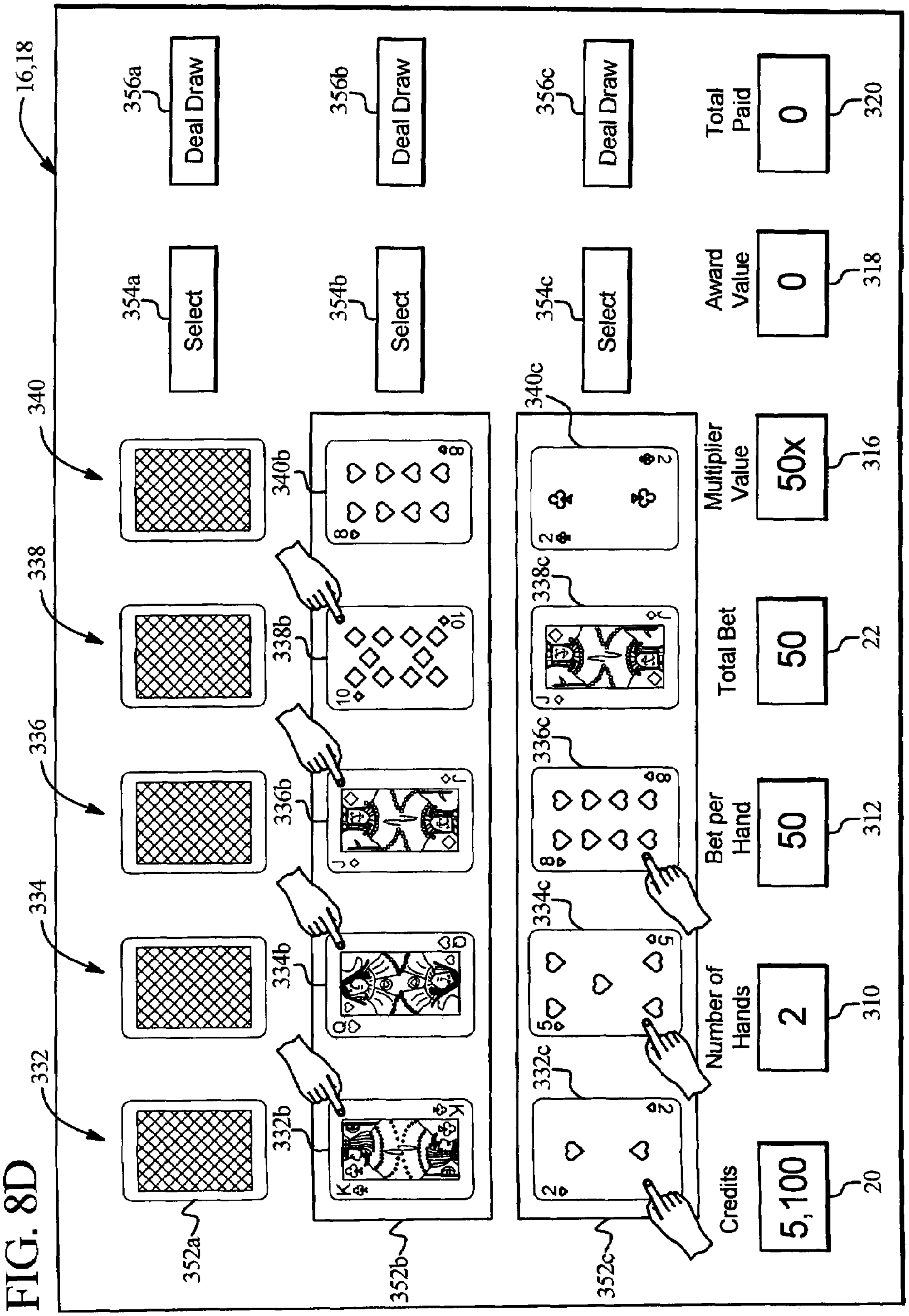

In one embodiment, the poker game is a draw poker game as illustrated in FIG. 8D. The player, in this embodiment, the hands are played independently wherein the draw/hold decisions for each hand are made independent of the draw/hold decisions for other hands. It should be appreciated that FIG. 8D can illustrate a continuation of the game of FIGS. 8A to 8C or a generation of five cards in the wager hand and the free hand. As illustrated, the player decides to hold the King of Clubs 332*b*, Queen of Hearts 334*b*, Jack of Diamonds 336*b* and Ten of Diamonds 338*b* in the wager hand 352*b*. The player also decides to hold the Two of Hearts 332*c*, Five of Hearts 334*c* and Eight of Hearts 336*c* in the free hand 352*c*.

Figure 8E:
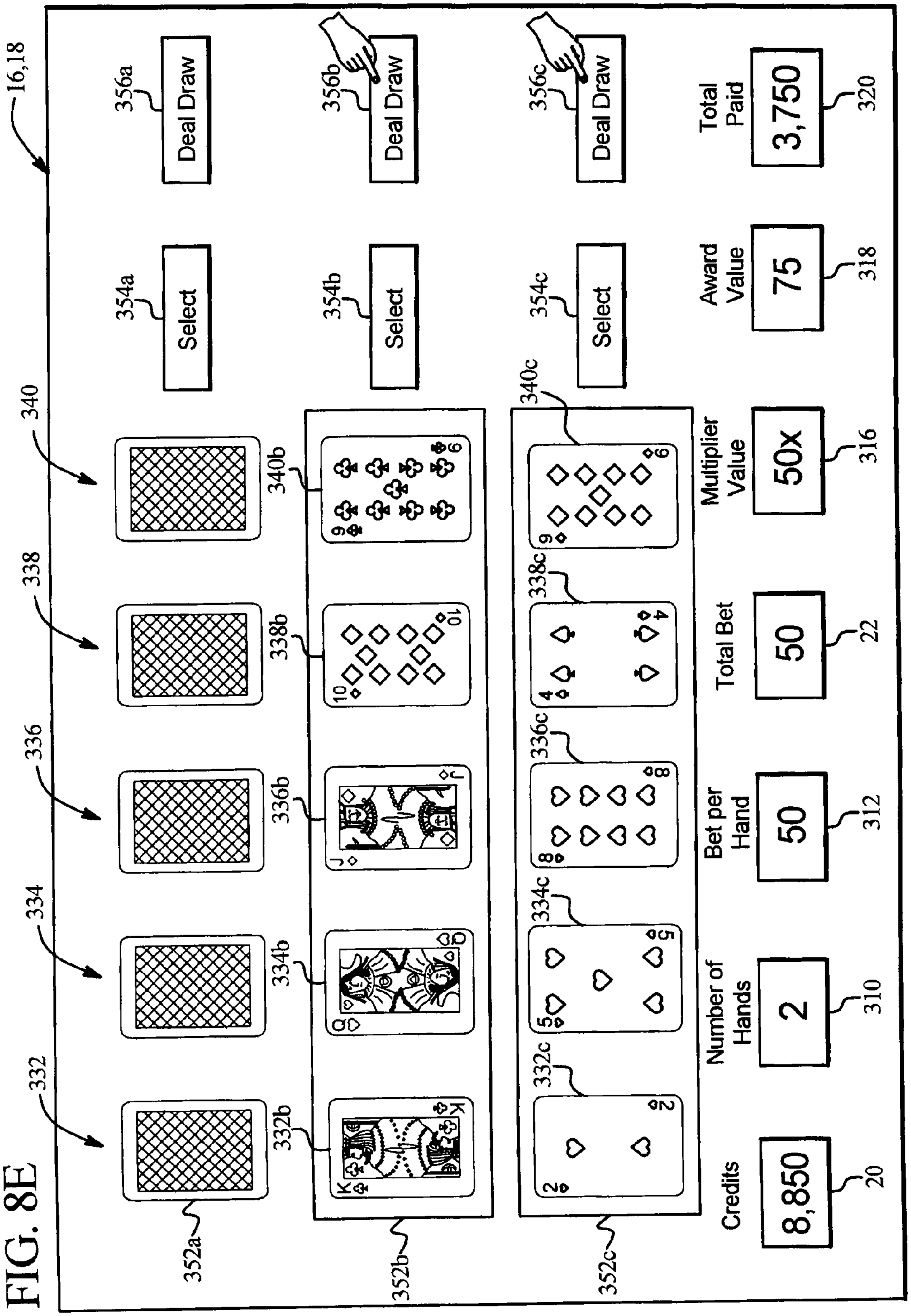

In FIG. 8E, the player pushes the deal/draw buttons 356*b* and 356*c* for the wager and free hands, respectively. The gaming device generates cards to replace each of the cards not held by the player. An Nine of Clubs 340*b* replaces the Eight of Hearts in the wager hand 352*b*. A Four of Spades 338*c* and a Nine of Diamonds 340*c* replace the Jack of Diamonds and Two of Clubs in the free hand 352*c*.

As a result of the draw in the wager hand, a winning hand of a Straight is generated. According to the paytable 360 in FIG. 9A, the award associated with a Straight generated in a hand on which a wager of fifty credits is placed is seventy-five credits as is indicated in the award value display 318. In an embodiment that includes enhancement of the awards associated with winning combinations generated on a wager hand, as illustrated in FIG. 8E, the 50× multiplier is used to enhance that award to three thousand seven hundred fifty credits (75 credits×50×) as indicated in the total paid display 320. No winning hand other than the Three-of-a-Kind as described above, is generated in the free hand 352*c*. The credits display 20 is then updated to include the additional credits for a total of eight thousand eight hundred fifty credits.

Although the example illustrated in FIGS. 8A to 8E describe using the same poker game for each of the hands, whether a wager hand or a free hand, it should be appreciated that in different embodiments, different poker games can be used to determine an award in the free hands and the wager hands. For example, the wager hands may use a five-card draw poker game, whereas the free hands use a five-card stud poker game. In addition, it should be appreciated that different numbers of cards or card positions can be used for the wager hands and the free hands. For example, the wager hands may use five card positions and the free hands may use seven card positions.

Other alternative embodiments include duplicating the cards dealt into the card positions of a hand into the card positions of other hands. For example, in one embodiment, cards are dealt to a free hand and duplicated in other free hands and/or the wager hands. Likewise, hold/draw decisions made for the cards in a hand can be duplicated for other hands. For example, if a player decides to hold two of the duplicated cards of a free hand, the same duplicated cards are held in the other free hands and/or wager hands.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device; and at least one processor programmed to operate with the at least one display device and the at least one input device to:

(a) display a game operable upon a total wager by a player, said game including:

(i) a plurality of symbol display positions;

(ii) a plurality of symbols displayable at the symbol display positions;

(iii) a plurality of winning symbol combinations and a plurality of respective award amounts associated with the plurality of winning symbol combinations;

(iv) a plurality of base paylines associated with the symbol display positions, each base payline associated with at least two of the plurality of symbol display positions, each base payline activated upon a placement of at least a portion of the total wager by the player on said base payline;

(v) a first number of free paylines activated if a first number of the base paylines are activated, wherein the first number of the base paylines is greater than one and less than a second number of the base paylines, each of the free paylines associated with at least two of the plurality of symbol display positions; and (vi) a second number of free paylines activated if a third number of the base paylines are activated, wherein the third number of the base paylines is greater than or equal to the second number of the base paylines, wherein the second number of free paylines is greater than the first number of free paylines and wherein each of the free paylines are associated with at least two of the plurality of symbol display positions;

(b) for each wagered on base payline:

(i) determine if one of the plurality of winning symbol combinations is displayed at the symbol display positions associated with the base payline based on a plurality of displayed symbols of the plurality of displayable symbols;

(ii) if one of the plurality of winning symbol combinations is displayed at the symbol display positions associated with the base payline, determine an award to provide the player by multiplying the award amount associated with the winning combination of symbols displayed at the symbol display positions associated with said base payline by the wager placed on that base payline; and (iii) display any determined award; and (c) for each activated free payline:

(i) determine if another of the plurality of winning symbol combinations is displayed based on an order of symbols displayed at the symbol display positions associated with the activated free payline based on the same plurality of displayed symbols;

(ii) if another of the plurality of winning symbol combinations is displayed at the symbol display positions associated with the activated free payline, determine an additional award to provide the player by multiplying the award amount associated with the winning combination of symbols displayed at the symbol display positions associated with the activated free payline by the total wager made by the player on all of the activated base paylines; and (iii) display any determined additional award.

2. The gaming device of claim 1, wherein a total award including the sum of the awards associated with any of said base paylines and the additional award is provided to the player.

3. The gaming device of claim 1, wherein the plurality of symbol display positions are arranged in a matrix of rows and columns.

4. The gaming device of claim 1, which includes a plurality of free paylines associated with the symbol display positions.

5. The gaming device of claim 1, which includes a plurality of reels in the game, wherein the symbols are on the reels.

6. A gaming device comprising:

at least one display device;

at least one input device; and at least one processor programmed to operate with the at least one display device and the at least one input device to:

(a) display a game operable upon a total wager by a player, said game including:

(i) a plurality of symbol display positions;

(ii) a plurality of symbols displayable at the symbol display positions;

(iii) a plurality of winning symbol combinations and a plurality of respective award amounts associated with the plurality of winning symbol combinations;

(iv) a plurality of base paylines associated with the symbol display positions, each base payline associated with at least two of the plurality of symbol display positions, each base payline activated upon a placement of at least a portion of the total wager by the player on said base payline;

(v) a first number of free paylines activated if a first number of the base paylines are activated, wherein the first number of the base paylines is greater than one and less than a second number of the base paylines, each free payline associated with at least two of the plurality of display positions; and (vi) a second number of free paylines activated if a third number of the base paylines are activated, wherein the third number of the base paylines is greater than or equal to the second number of the base paylines, wherein the second number of free paylines is greater than the first number of free paylines and wherein each of the free paylines are associated with at least two of the plurality of symbol display positions;

(b) for each wagered on base payline:

(i) determine if one of the plurality of winning symbol combinations is displayed at the symbol display positions associated with the base payline based on a plurality of displayed symbols of the plurality of displayable symbols;

(ii) if one of the plurality of winning symbol combinations is displayed at the symbol display positions associated with the base payline, determine an award to provide the player by multiplying the award amount associated with the winning combination of symbols displayed at the symbol display positions associated with said base payline by the wager placed on that base payline; and (iii) display any determined award; and (c) for each activated free payline:

(i) determine if another of the plurality of winning symbol combinations is displayed based on an order of symbols displayed at the symbol display positions associated the activated free payline based on the same plurality of displayed symbols;

(ii) if another of the plurality of winning symbol combinations is displayed at the symbol display positions associated with the activated free payline, determine an additional award to provide the player by multiplying the award amount associated with the winning combination of symbols displayed at the symbol display positions associated with the activated free payline by the total wager made by the player on all of the activated base paylines; and (iii) display any determined additional award.

7. The gaming device of claim 6, wherein a total award including the sum of the awards associated with the base paylines and the additional award is provided to the player.

8. The gaming device of claim 6, wherein the plurality of symbol display positions are arranged in a matrix of rows and columns.

9. The gaming device of claim 6, which includes a plurality of free paylines associated with the symbol display positions.

10. The gaming device of claim 6, which includes a plurality of reels in the game, wherein the symbols are on the reels.

11. A method of operating a gaming device, said method comprising:

displaying a plurality of symbol display positions;

displaying a plurality of base paylines associated with the symbol display positions;

enabling a player to activate each of the base paylines by placing at least a portion of a total wager on said payline;

activating a first number of free paylines if the player activates a first number of the base paylines, wherein the first number of the base paylines is greater than one and less than a second number of said base paylines, wherein each free payline is associated with at least two of the symbol display positions;

activating a second number of free paylines if the player activates a third number of the base paylines, wherein the third number of the base paylines is greater than or equal to the second number of the base paylines, wherein the second number of free paylines is greater than the first number of free paylines and wherein each of the free paylines are associated with at least two of the plurality of symbol display positions;

generating and displaying a plurality of symbols at the symbol display positions;

for each wagered on base payline:

(i) determining if one of a plurality of winning symbol combinations is displayed at the symbol display positions associated with the base payline based on the plurality of generated and displayed symbols;

(ii) if one of the plurality of winning symbol combinations is displayed at the symbol display positions associated with the base payline, determine an award to provide the player by multiplying the award amount associated with the winning combination of symbols displayed at the symbol display positions associated with said base payline by the wager placed on that base payline; and (iii) displaying any determined award; and for each activated free payline:

(i) determining if another of the plurality of winning symbol combinations is displayed based on an order of symbols displayed at the symbol display positions associated with the activated free payline based on the same plurality of generated and displayed symbols;

(ii) if another of the plurality of winning symbol combinations is displayed at the symbol display positions associated with the activated free payline, determine an additional award to provide the player by multiplying the award amount associated with the winning combination of symbols displayed at the symbol display positions associated with the activated free payline by the total wager made by the player on all of the activated base paylines; and (iii) displaying any determined additional award.

12. The method of claim 11, which includes displaying the plurality of symbol display positions on a plurality of reels.

13. The method of claim 11, which includes displaying the plurality of symbol display positions in a matrix of rows and columns.

14. The method of claim 11, which is operated via a data network.

15. The method of claim 14, wherein the data network is an internet.

16. A method of operating a gaming device, said method comprising:

displaying a plurality of symbol display positions;

displaying a plurality of base paylines associated with the symbol display positions;

enabling a player to activate each of the base paylines by placing at least a portion of a total wager on said payline;

activating a first number of free paylines if a first number of the base paylines are activated, wherein the first number of the base paylines is greater than one and less than a second number of the base paylines and each free payline is associated with at least two of the symbol display positions;

activating a second number of free paylines if a third number of the base paylines are activated, wherein the third number of the base paylines is greater than or equal to the second number of the base paylines, and wherein the second number of free paylines is greater than the first number of free paylines;

generating and displaying a plurality of symbols at the symbol display positions;

for each wagered on base payline:

(i) determining if one of a plurality of winning symbol combinations is displayed at the symbol display positions associated with the base payline based on the plurality of generated and displayed symbols;

(ii) if one of the plurality of winning symbol combinations is displayed at the symbol display positions associated with the base payline, determine an award to provide the player by multiplying the award amount associated with the winning combination of symbols displayed at the symbol display positions associated with said base payline by the wager placed on that base payline; and (iii) displaying any determined awards; and for each activated free payline:

(i) determining if another of the plurality of winning symbol combinations is displayed based on an order of symbols displayed at the symbol display positions associated with the activated free payline based on the same plurality of generated and displayed symbols;

(ii) if another of the plurality of winning symbol combinations is displayed at the symbol display positions associated with the activated free payline, determine an additional award to provide the player by multiplying the award associated with the winning combination of symbols displayed at said symbol display positions associated with the activated free payline by the total wager made by the player on all of the activated base paylines; and (iii) displaying any determined additional award.

17. The method of claim 16, which includes displaying the plurality of symbol display positions on a plurality of reels.

18. The method of claim 16, which includes displaying the plurality of symbol display positions in a matrix of rows and columns.

19. The method of claim 16, which is operated via a data network.

20. The method of claim 19, wherein the data network is an internet.

21. A gaming system comprising:

at least one display device;

at least one input device;

at least one processor; and at least one memory device storing a plurality of instructions, which when executed by the at least one processor, cause the at least one processor to operate with the at least one display device and the at least one input device to:

(a) display a game operable upon a total wager by a player, said game including:

(i) a plurality of symbol display positions;

(ii) a plurality of symbols displayable at the symbol display positions;

(iii) a plurality of winning symbol combinations and a plurality of respective award amounts associated with the plurality of winning symbol combinations;

(iv) a plurality of base paylines associated with the symbol display positions, each base payline associated with at least two of the plurality of symbol display positions, each base payline activated upon a placement of at least a portion of the total wager by the player on said base payline; and (v) a first number of free paylines activated if a first number of the base paylines are activated, wherein the first number of the base paylines is greater than one and less than a second number of the base paylines, each free payline associated with at least two of the plurality of symbol display positions; and (vi) a second number of free paylines activated if a third number of the base paylines are activated, wherein the third number of the base paylines is greater than or equal to the second number of the base paylines, wherein the second number of free paylines is greater than the first number of free paylines and wherein each of the free paylines are associated with at least two of the plurality of symbol display positions;

(b) for each wagered on base payline:

(i) determine if one of the plurality of winning symbol combinations is displayed at the symbol display positions associated with the base payline based on a plurality of displayed symbols of the plurality of displayable symbols;

(ii) if one of the plurality of winning symbol combinations is displayed at the symbol display positions associated with the base payline, determine an award to provide the player by multiplying the award amount associated with the winning combination of symbols displayed at the symbol display positions associated with said base payline by the wager placed on that base payline; and (iii) display any determined award; and (c) for each activated free payline:

(i) determine if another of the plurality of winning symbol combinations is displayed based on an order of symbols displayed at the symbol display positions associated with the activated free payline based on the same plurality of displayed symbols;

(ii) if another of the plurality of winning symbol combinations is displayed at the symbol display positions associated with the activated free payline, determine an additional award to provide the player by multiplying the award amount associated with the winning combination of symbols displayed at the symbol display positions associated with the activated free payline by the total wager made by the player on all of the activated base paylines; and (iii) display any determined additional award.

* * * * *

UNITED STATES PATENT AND TRADEMARK OFFICE

CERTIFICATE OF CORRECTION

PATENT NO. : 7,607,980 B2
APPLICATION NO. : 10/984169
DATED : October 27, 2009
INVENTOR(S) : Masci et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Twelfth Day of October, 2010

David J. Kappos

*Director of the United States Patent and Trademark Office*